(12) United States Patent
Zadicario et al.

(10) Patent No.: US 8,301,760 B1
(45) Date of Patent: Oct. 30, 2012

(54) MULTI-NETWORK TYPE COORDINATOR FOR A SINGLE PHYSICAL LAYER

(75) Inventors: Raphi Zadicario, Tel-Aviv (IL); Ron Sterenson, Raanana (IL); Aharona Lurie, Or Yehuda (IL); Reuven Franco, Tel Aviv (IL); Rani Keren, Ramat HaSharon (IL); Boaz Kol, Hod-Hasharon (IL)

(73) Assignee: Coppergate Communication Ltd., Tel Aviv (IL)

( * ) Notice: Subject to any disclaimer, the term of this patent is extended or adjusted under 35 U.S.C. 154(b) by 280 days.

(21) Appl. No.: 12/392,542

(22) Filed: Feb. 25, 2009

Related U.S. Application Data

(60) Provisional application No. 61/031,644, filed on Feb. 26, 2008.

(51) Int. Cl.
*G06F 15/173* (2006.01)
(52) U.S. Cl. ......... 709/224; 709/226; 709/227; 709/229
(58) Field of Classification Search .................. 709/224, 709/226, 227, 229
See application file for complete search history.

(56) References Cited

U.S. PATENT DOCUMENTS

| | | | |
|---|---|---|---|
| 6,868,072 B1 * | 3/2005 | Lin et al. | 370/276 |
| 7,031,274 B2 | 4/2006 | Sherman | |
| 7,610,399 B1 * | 10/2009 | Lin et al. | 709/236 |
| 2002/0006136 A1 * | 1/2002 | Mallory et al. | 370/466 |
| 2004/0141522 A1 * | 7/2004 | Texerman et al. | 370/466 |

* cited by examiner

*Primary Examiner* — Larry Donaghue
*Assistant Examiner* — Nicholas Taylor
(74) *Attorney, Agent, or Firm* — Fish & Richardson P.C.

(57) ABSTRACT

Method for coordinating the use of a physical layer between a first network and a second network sharing the physical layer, the first network including at least one device operating using a first network protocol, the second network including at least one device operating using a second network protocol different from the first network protocol, a device in the first network not communicating with a device in the second network, including the procedures of determining required resources of the first network, determining required resources of the second network, requesting the required resources of the first network from a master device of the second network, requesting the required resources of the second network from a master device of the first network, allocating resources to the first network, by the master device of the second network, and allocating resources to the second network by the master of the first network.

67 Claims, 14 Drawing Sheets

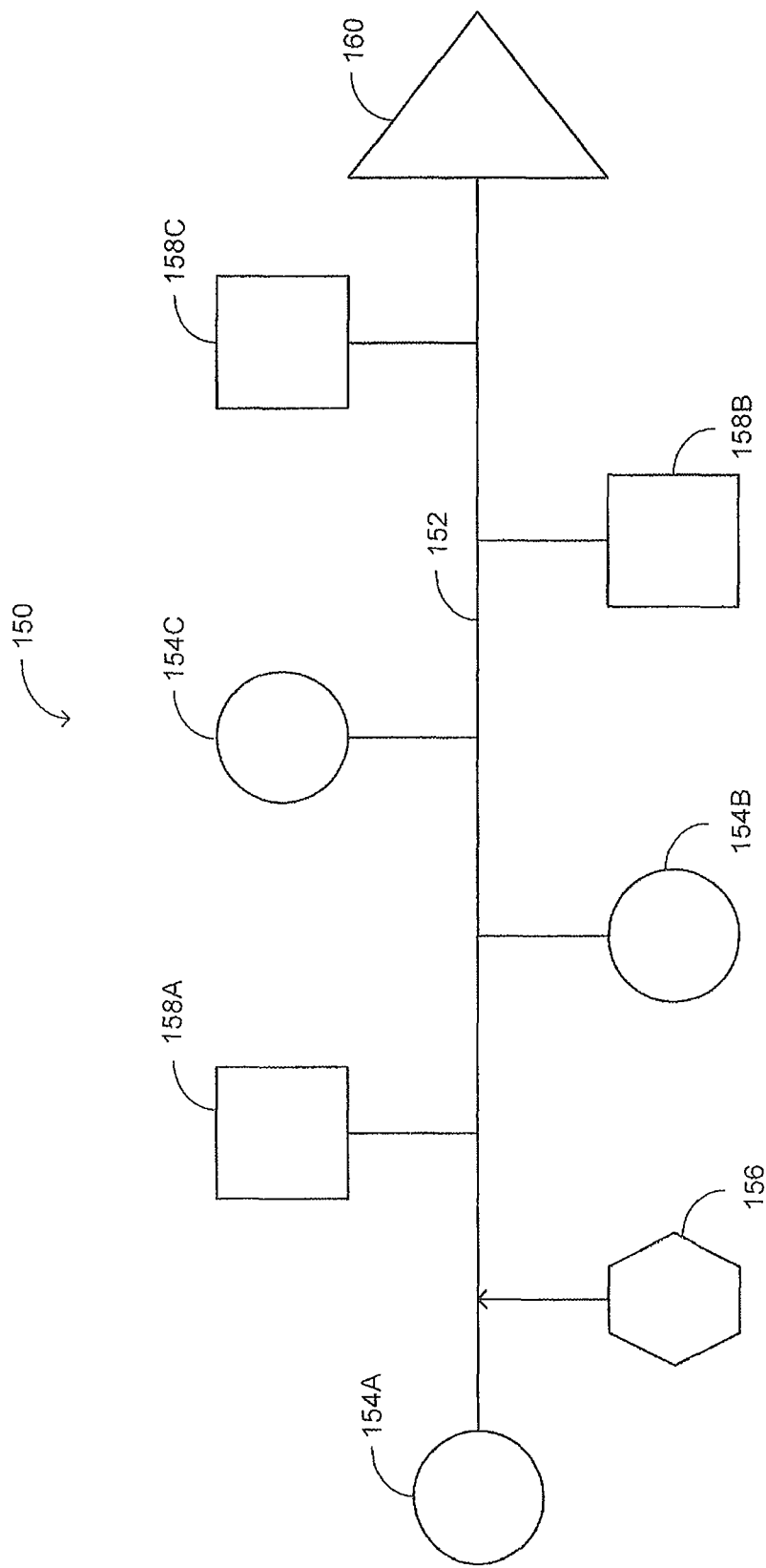

MULTI-NETWORK TYPE COORDINATOR FOR A SINGLE PHYSICAL LAYER

FIELD OF THE DISCLOSED TECHNIQUE

The disclosed technique relates to network coordination, in general, and to methods and systems for coordinating multiple network types over a single physical layer, in particular.

BACKGROUND OF THE DISCLOSED TECHNIQUE

Communication networks use a physical layer to transmit their respective transmissions between the devices or nodes in the network. This physical layer may be, for example, Ethernet cables, power lines, telephone cables and television cables. For each of the devices on the network to communicate with one another a particular protocol is defined and used by all devices on the network. The protocol substantially defines how data is to be transmitted over the network, what form it should have, how devices can join the network and the like. In the art, the term standard is used interchangeably with the term protocol. Two different networks using the same standard for communication and transmission are said to be networks of the same type. Two different networks, each using a different standard for communication and transmission, are said to be networks of different type. In general, different network types cannot communicate with one another. However, in some cases, two different networks are required to share the same physical layer. This may result in the two networks interfering with the transmissions of one another. Therefore, it would be desirable to enable the use of the same physical layer by two different networks without the networks interfering with the transmissions thereof.

U.S. Pat. No. 7,031,274 to Sherman, entitled "Method for enabling interoperability between data transmission systems conforming to IEEE 802.11 and HIPERLAN standards" is directed towards a method for enabling interoperability between data transmission of Wireless Local Area Network (WLAN) stations operating in different standards, the IEEE® 802.11 and the High Performance Radio Local Area Network (HIPERLAN). In both standards, the WLAN stations access the network via an Access Port (AP). It is desirable that the AP support both standards. According to the method of Sherman, a super-frame which includes a Contention Free Period (CPF) is defined. During the CFP, the AP sends polls to each IEEE® 802.11 station, one at a time, to give them the right to send a packet. Furthermore, the AP sends a spoofing or blocking frame after a determined time period within the CFP. This spoofing frame inhibits IEEE® 802.11 stations from transmitting. In the remaining time period of the CFP the HIPERLAN stations transmit their packets. The IEEE® 802.11 stations see a large CFP with un-detectable transmissions.

SUMMARY OF THE PRESENT DISCLOSED TECHNIQUE

It is an object of the disclosed technique to provide a novel method and system for coordinating multiple network types over a single physical layer which overcomes the disadvantages of the prior art. In accordance with the disclosed technique, there is thus provided a method for coordinating the use of a physical layer between a first network and a second network. The first network includes at least one device of a first network type. The device of the first network type operates using a first network protocol and is coupled with the physical layer. The second network includes at least one device of a second network type. The device of the second network type operates using a second network protocol different from the first network protocol and is coupled with the physical layer. A device in the first network does not communicate with a device in the second network. The method includes the procedures of determining required resources of the first network, for a next transmission cycle, determining required resources of the second network, for the next transmission cycle, requesting the required resources of the first network, from a master device of the second network, according to the second network protocol and requesting the required resources of the second network, from a master device of the first network, according to the first network protocol. The method also includes the procedures of allocating resources to the first network, by the master device of the second network, according to the resources requested from the master of the second network, and allocating resources to the second network by the master of the first network, according to the resources requested from the master of the first network.

According to another aspect of the disclosed technique, there is thus provided at least two networks coupled with the same physical layer, devices in each network communicating according to a network protocol respective of each network, with a device in one network being unable to communicate with a device in another network. The two networks include at least one device of a first network type, at least one device of a second network type and a coordinator. The device of the first network type is coupled with the physical layer, the device of the second network type is coupled with the physical layer and the coordinator is coupled with the physical layer. The device of the first network type forms a first network and operates using a first network protocol. The device of the second network type forms a second network and operates using a second network protocol different from the first network protocol. The coordinator coordinates the use of the physical layer between the first network and the second network.

The coordinator includes a receiver, a transmitter, a coordinator first network type device, a coordinator second network type device and a synchronizer and coordinator. The coordinator first network type device is coupled with the receiver and the transmitter, the coordinator second network type device is also coupled with the receiver and the transmitter, and the synchronizer and coordinator is coupled with the coordinator first network type device and with the coordinator second network type device. The receiver is for receiving messages transmitted over the physical layer and the transmitter is for transmitting messages over the physical layer.

The synchronizer and coordinator includes a required resources determinator for determining the required resources of the first network for a next transmission cycle by receiving, from the coordinator first network type device, information relating to the use the first network makes of the physical layer. The required resources determinator also determines the required resources of the second network for the next transmission cycle by receiving via the receiver, from the coordinator second network type device, information relating to the use the second network makes of the physical layer. The required resources determinator provides the required resources of the first network to the coordinator second network type device, and also provides the required resources of the second network to the coordinator first network type device. The coordinator second network type device transmits, via the transmitter, a request for the required resources for the first network from the master device of the second network according to the first network protocol. The coordinator first network type device transmits, via the transmitter, a request for the required resources for the second network from the master device of the first network according to the second network protocol. The master device of the second network allocates resources to the first network, according to the resources requested from the master device of the second network. The master device of the first network allocates resources to the second network, according to the resources requested from the master device of the first network.

According to a further aspect of the disclosed technique, there is thus provided a coordinator for coordinating the use of a physical layer between a first network and a second network. The coordinator includes a receiver, a transmitter, a coordinator first network type device, a coordinator second network type device and a synchronizer and coordinator. The coordinator first network type device is coupled with the receiver and with the transmitter, the coordinator second network type device is coupled with the receiver and with the transmitter, and the synchronizer and coordinator is coupled with the coordinator first network type device and with the coordinator second network type device. The receiver is for receiving messages transmitted over the physical layer and the transmitter is for transmitting messages over the physical layer.

The coordinator is coupled with the physical layer, with the first network including at least one device of a first network type and with the second network including at least one device of a second network type. The device of the first network type operates using a first network protocol and is coupled with the physical layer. The device of the second network type operates using a second network protocol different from the first network protocol and is also coupled with the physical layer.

The synchronizer and coordinator includes a required resources determinator for determining the required resources of the first network for the next transmission cycle by receiving, via the receiver, from the coordinator first network type device, information relating to the use the first network makes of the physical layer. The required resources determinator also determines the required resources of the second network for the next transmission cycle by receiving, from the coordinator second network type device, information relating to the use the second network makes of the physical layer. The required resources determinator provides the required resources of the first network to the coordinator second network type device. The required resources determinator provides the required resources of the second network to the coordinator first network type device. The coordinator second network type device transmits, via the transmitter, a request for the required resources for the first network from the master device of the second network, according to the first network protocol. The coordinator first network type device transmits, via the transmitter, a request for the required resources for the second network from the master device of the first network according to the second network protocol. The master device of the second network allocates resources to the first network, according to the resources requested from the master device of the second network. The master device of the first network allocates resources to the second network, according to the resources requested from the master device of the first network, thereby coordinating the use of the physical layer between the first network and the second network.

BRIEF DESCRIPTION OF THE DRAWINGS

The disclosed technique will be understood and appreciated more fully from the following detailed description taken in conjunction with the drawings in which:

FIG. 1C is a schematic illustration of two network types sharing a physical layer, constructed and operative in accordance with a further embodiment of the disclosed technique;

DETAILED DESCRIPTION OF THE DISCLOSED TECHNIQUE

The disclosed technique overcomes the disadvantages of the prior art by providing a novel networking standard for enabling different network types to coexist, substantially without interference from one another, on a single physical layer, and by providing a method for enabling interoperability between two types of networks. The novel networking standard can communicate with the various network types and can also coordinate use of the single physical layer between the various network types. It is noted that the disclosed technique relates to network types which operate using centralized management, as explained below in FIG. 1A.

In general, networks refer to a plurality of devices coupled together over a particular medium which can communicate with one another (i.e., transmit and received information). This medium is referred to as the physical layer. For example, the physical layer can be Ethernet cables, power lines, telephone cables, television cables, wireless connections (e.g., Wi-Fi®, WiMax®, Zigbee®, Bluetooth®, IEEE® 802.11, Freeair optics, Ultra Wide Bandwidth), and the like. For each of the devices on the network to communicate with one another, a particular protocol is defined and used by all devices on the network. The protocol substantially defines how data is to be transmitted over the network, what form it should have (i.e., the structure of each frame), how devices can join the network (e.g., link layer protocol, media access control—MAC), and the like. The term standard is used interchangeably with the term protocol. Two different networks using the same standard for communication and transmission are said to be networks of the same type. Two different networks, each using a different standard for communication and transmission, are said to be networks of different types. In general, different network types cannot communicate with one another, without employing a protocol converting module. Each device on the network is also termed a node on the network, and depending on how the devices on the network are managed, each node may either manage itself or be managed by a central node, which is also referred to as a master device or simply a master. This is explained in more detail in FIG. 1A.

Figure 1A:
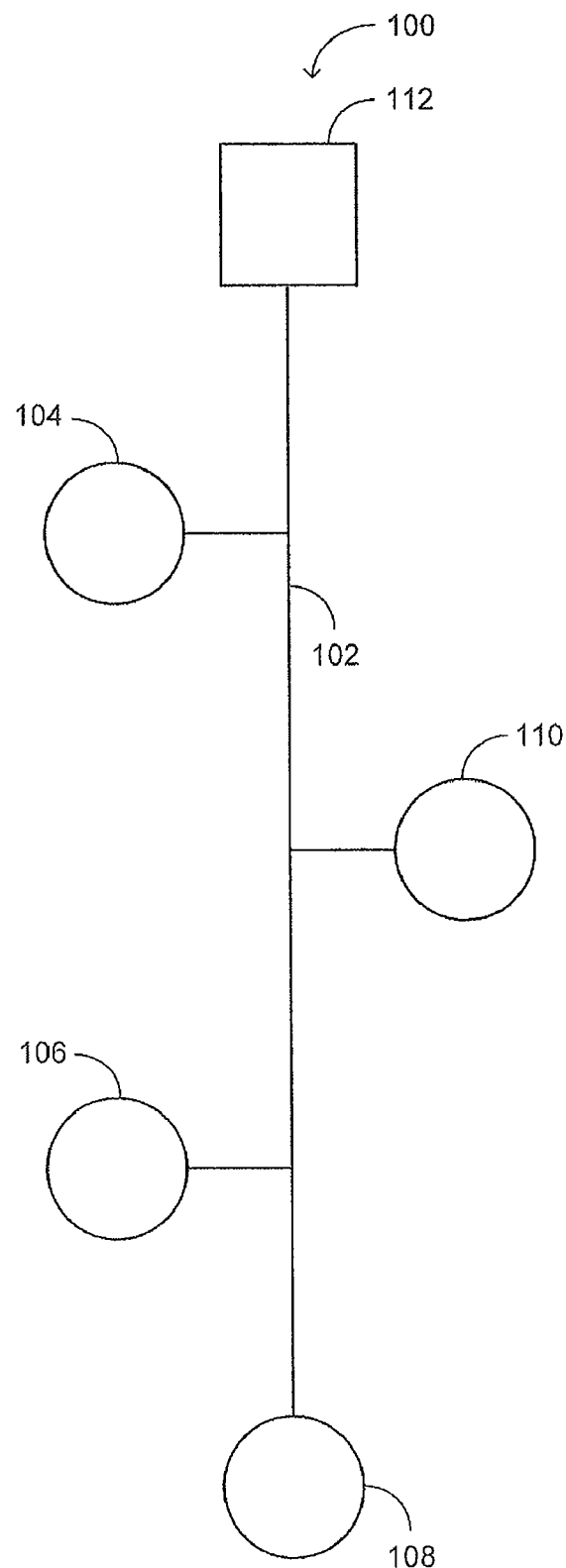
FIG. 1A is a schematic illustration of a network using centralized management, constructed and operative in accordance with an embodiment of the disclosed technique.

Reference is now made to FIG. 1A, which is a schematic illustration of a network using a centralized management, generally referenced 100, constructed and operative in accordance with an embodiment of the disclosed technique. Network 100 includes a physical layer 102, a plurality of nodes 104, 106, 108 and 110 and a master device 112. Each of nodes 104, 106, 108 and 110, as well as master device 112, represents a device on network 100. Master device 112 can be referred to as a master node. Each of nodes 104, 106, 108, and 110 can be, for example, a computer, telephone, television, and the like. Master device 112 manages the use of the resources (i.e., bandwidth, time and power) of physical layer 102 between the various nodes. For example, master device 112 decides which time slot or slots of each of nodes 104, 106, 108, and 110 can transmit over physical layer 102 to other nodes.

In general, at any given time, only one device can use the physical layer to transmit data. If more than one device attempts to use the physical layer at the same time, then the data transmitted by both devices may become corrupted, not reach their respective destinations, or collisions can occur. Such an occurrence is known as interference. In order to avoid interference on network 100, as mentioned above, master device 112 manages the resources of network 100 (i.e., the times, frequencies and power available on physical layer 102 for transmitting data). Network 100, as illustrated in FIG. 1A, is an example of a network using centralized management. Other ways of managing networks are, for example, in ad hoc networks, where each node may manage itself, without any node being designated a master node (i.e., distributed network).

In general, network 100 uses a particular protocol for defining how data is transmitted over physical layer 102. Usually, the protocol will define a particular amount of time, known as a cycle, during which the various devices on the network can use the physical layer. As its name implies, after one cycle is over, another cycle begins. In general, each cycle is divided into time slots. Time slots are also referred to as transmission opportunities. In managing network 100, master device 112 will assign certain time slots in each cycle for each of nodes 104, 106, 108 and 110 to use. Depending on the protocol used, nodes 104, 106, 108 and 110 may be able to make requests of master device 112 to reserve more time slots in a particular cycle or cycles. This is explained further in FIG. 1B.

Figure 1B:
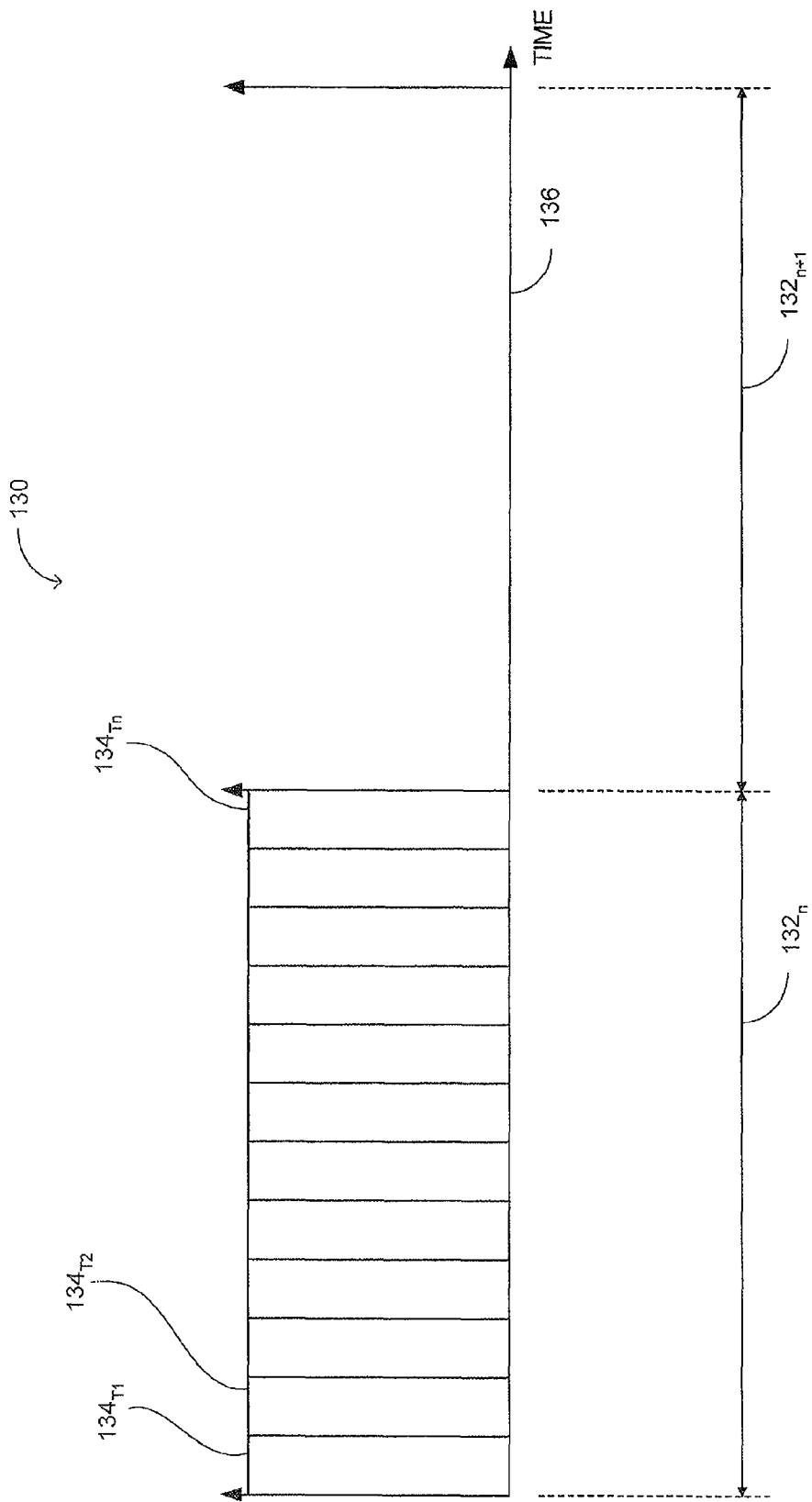
FIG. 1B is a schematic illustration of network cycles, constructed and operative in accordance with another embodiment of the disclosed technique.

Reference is now made to FIG. 1B, which is a schematic illustration of a plurality of network cycles, generally referenced 130, constructed and operative in accordance with another embodiment of the disclosed technique. Network cycles 130 show two cycles, $132_n$ and $132_{n+1}$. A horizontal axis 136 represents the time. As can be seen, cycle $132_n$ is subdivided to time slots $134_{T1}$, $134_{T2}$ and $134_{Tn}$, with each time slot demarcating an amount of time a particular device (not shown) can use the physical layer (not shown) of the network. For example, if cycle $132_n$ is subdivided into 15 time slots, then a master device (not shown) may allocate to a first device time slots $134_{T1}$ to $134_{T4}$ for transmitting data. To a second device, the master device may allocate time slots $134_{T6}$ to $134_{T11}$ for transmitting data, and to a third device, time slots $134_{T14}$ and $134_{T15}$ may be allocated for data transmission. In this example, time slots $134_{T5}$, $134_{T12}$ and $134_{T13}$ are not allocated to any of the devices and may be reserved for the master device to transmit a message to all devices on the network.

In general, the number of time slots allocated to a particular device can be referred to as the bandwidth allocated to the device, where the bandwidth is an indication of how much data a particular device can transmit in a given cycle. Depending on how the data is encoded, each time slot substantially defines an upper limit of how much data can be transmitted per time slot.

Reference is now made to FIG. 1C, which is a schematic illustration of two network types sharing a physical layer, generally referenced 150, constructed and operative in accordance with a further embodiment of the disclosed technique. FIG. 1C includes a physical layer 152, a first network and a second network. The first network includes devices 154A, 154B, 154C and a master device 156. The second network includes devices 158A, 158B, 158C and a master device 160. The first network and the second network are different network types, meaning they use different protocols and cannot communicate with one another or coordinate the use of the physical layer. This is shown in FIG. 1D.

Figure 1D:
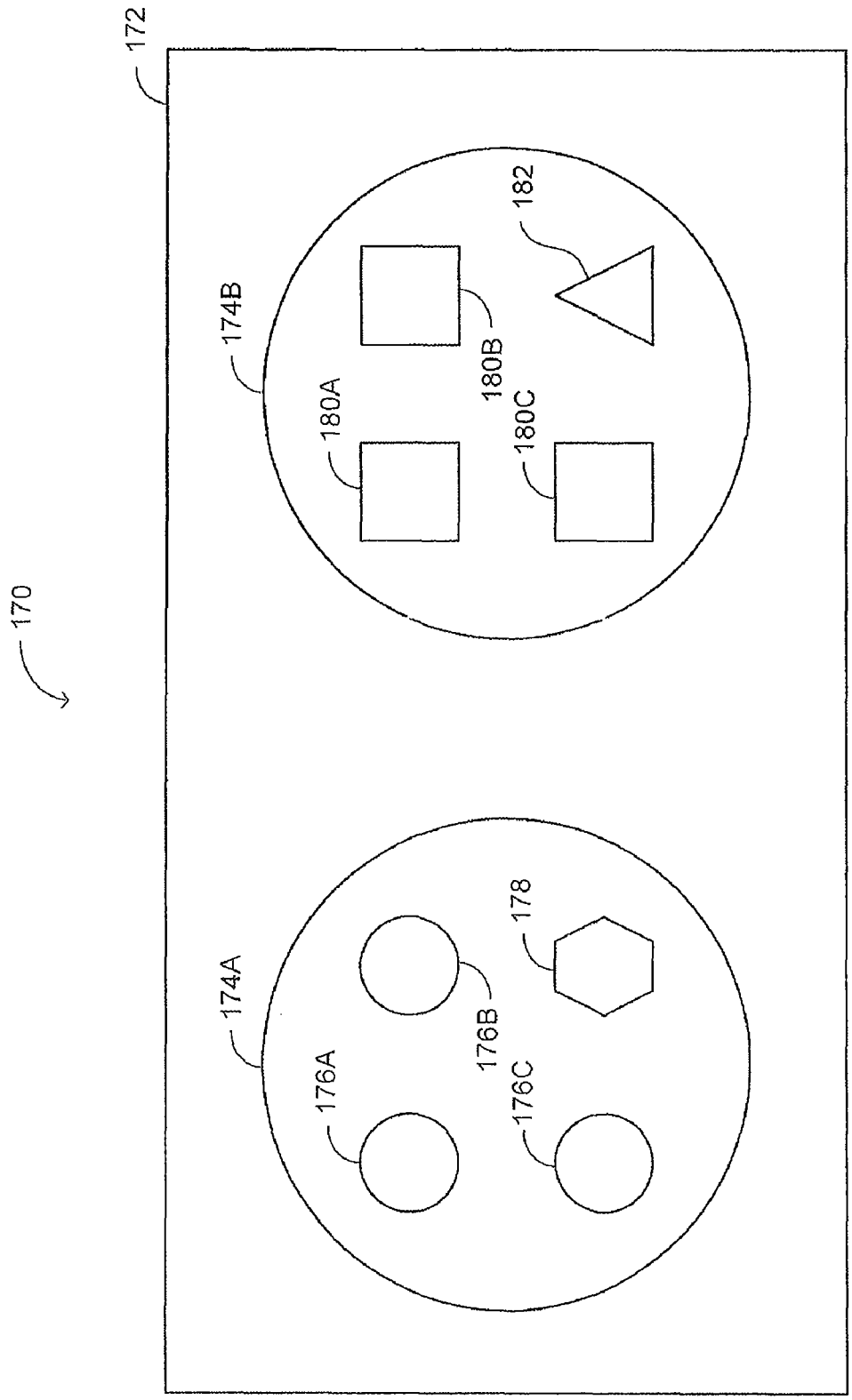
FIG. 1D is a Venn diagram of the two network types sharing a physical layer of FIG. 1C, constructed and operative in accordance with another embodiment of the disclosed technique.

Reference is now made to FIG. 1D, which is a Venn diagram of the two network types sharing the physical layer of the network of FIG. 1C, generally referenced 170, constructed and operative in accordance with another embodiment of the disclosed technique. Venn diagram 170 includes an outer circle 172, denoting the physical layer, and two inner circles, 174A and 174B, each representing a different network type. As can be seen, network type 174A and network type 174B share the same physical layer 172, although since they are different network types, they cannot communicate with one another or coordinate the use of the physical layer and hence there is no overlap of the two inner circles. As in FIG. 1C, network type 174A includes devices 176A, 176B, 176C and a master device 178 for managing those devices. Network type 174B includes devices 180A, 180B, 180C and a master device 182 for managing those devices.

Referring back to FIG. 1C, since the two different network types share a common physical layer, the first network and the second network can be termed as coexisting on a low level. Low level coexistence can be defined as two different network types sharing a common physical layer, where the two network types, each employing different protocols, cannot communicate with one another or coordinate the use of the physical layer. Low level coexistence can also be termed no coexistence. In general, in such a setup, each network type will treat transmissions of the other network type as interference. In attempting to transmit data, each network will generally use any mechanism available to it, as defined by the protocol thereof for overcoming or dealing with interference. Such a setup may be inefficient as each network 'views' the physical layer as exhibiting interference (i.e., since both networks may be constantly trying to transmit data over the physical layer).

As example of the setup in FIGS. 1C and 1D is a home network (herein abbreviated HN) setup. HNs are systems and methods for transmitting data to devices in a home over existing cables in the home, such as phone lines, also known as phone cables, and television cables, also known as coaxial, or coax cables. HNs provide data transfer in a home similar to that provided by Ethernet cables and wireless devices without new wires being installed in the home, and without the interference that wireless devices usually suffer from.

Different types of protocols have been defined for transmitting data over HNs. For example, the Home Phone Networking Alliance™ (herein abbreviated HPNA) has defined a number of versions of their standard for HNs, known as the HPNA specification. HPNA's state of the art HPNA specification is known as HPNA specification 3.1 (herein abbreviated HPNA3.1). HPNA3.1 defines a protocol for a centralized managed network, whereby one of the devices on the network is defined as a master device and manages all the other devices on the network in terms of the use of the resources of the network. In particular, the protocol used by HPNA3.1 is known as the G.9954 protocol. A new standard for HNs is being developed, known as G.HN, which will provide enhanced features over those of HPNA3.1.

For example, in HPNA3.1, if two such networks share a common physical layer, or if the physical layer of a first HPNA3.1 network is physically adjacent to the physical layer of a second HPNA3.1, such that transmissions from one network interfere with transmissions from the other network, then each network may suffer from interference from the other network. In HPNA3.1, all nodes sharing the same medium must belong to a single network, managed by a single master device. In a similar setup, in which two networks share a common physical layer, and each network uses the G.HN protocol, the master device of the first G.HN network will be able to communicate with the master device of the second G.HN network. Thus, the two master devices will be able to coordinate the use of the physical layer between each of the networks, such that each network does not interfere with the other network. In general, the G.HN protocol is not planned to have the ability to communicate with HPNA3.1. Therefore, the setup, as shown in FIGS. 1C and 1D, can be realized in a HN (i.e., a setup having one physical layer, such as phone lines in a house), where some of the devices use HPNA3.1 to transmit data, and other devices use the G.HN protocol to transmit data.

In such a setup, the devices using HPNA3.1 will form one network and the devices using G.HN will form another network. Each network will treat transmissions from the other network as interference, as each network has no definition in the protocol thereof for communicating with a device from the other network.

Figure 2A:
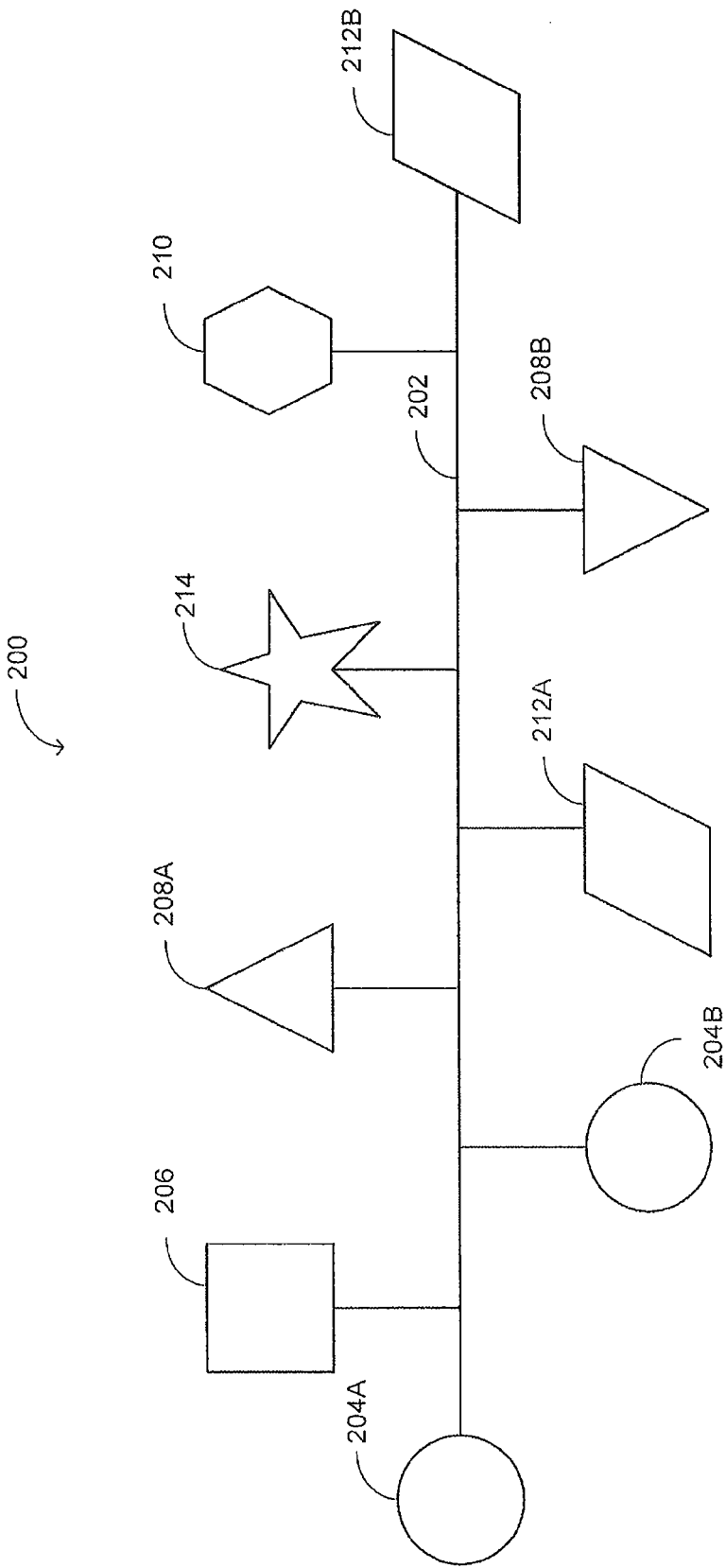
FIG. 2A is a schematic illustration of three network types sharing a physical layer, constructed and operative in accordance with a further embodiment of the disclosed technique.

Reference is now made to FIG. 2A, which is a schematic illustration of three network types sharing a physical layer, generally referenced 200, constructed and operative in accordance with a further embodiment of the disclosed technique. FIG. 2A includes a physical layer 202, a first network type, a second network type and a third network type. It is noted that each network type is different and that each network type operates using a protocol which supports centralized managed networks. As shown in more detail in FIG. 2B, the three network types are organized into two different networks. The first network type includes a plurality of devices 204A and 204B and a master device 206, the second network type includes a plurality of devices 208A and 208B and a master device 210, and the third network type includes a plurality of devices 212A and 212B and a master device 214. As described below, master device 214 can also be referred to as a coordinator device. Devices 204A, 204B, 206, 212A, 212B and 214 forms a first network, and devices 208A, 208B, 210, 212A, 212B and 214 form a second network. In other words, the first and third network types form a first network, and the second and third network types form a second network.

In the network setup of FIG. 2A, the first network type and the second network type cannot communicate with one another or coordinate the use of physical layer 202, thus exhibiting a low level of coexistence, as in FIGS. 1C and 1D. For example, the first network type may be using the HPNA3.1 protocol whereas the second network type may be using the G.HN protocol. The third network type uses a novel protocol, as specified by the disclosed technique and described below. This novel protocol enables a device, such as device 214, to act as a coordinator of the resources (i.e., time, frequency and power resources) of physical layer 202 between the first network and the second network. Thereby, the coordinator device 214 enables the first network type and the second network type to coordinate the use of physical layer 202. In such a setup, the first network type and the second network type can be defined as coexisting on a medium level, since the third network type enables via itself the two other types to communicate with one another, regarding their usage requests of the physical layer. At a medium level of coexistence, a plurality of network types organized into a plurality of networks can share a common physical layer without experiencing interference from the data transmissions of the other networks, even though they cannot directly communicate with one another.

Figure 2B:
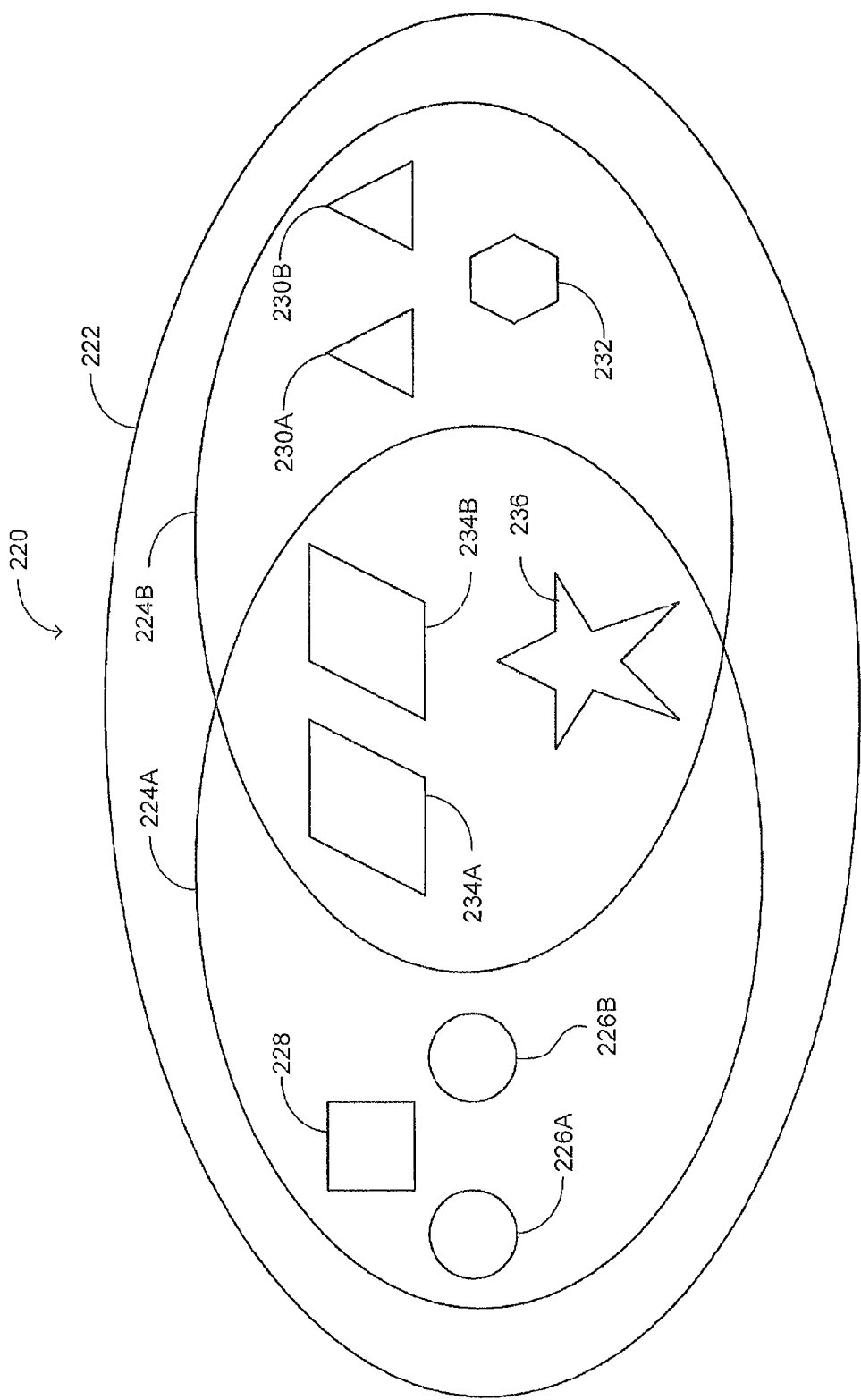
FIG. 2B is a Venn diagram of the three network types sharing a physical layer of FIG. 2A, constructed and operative in accordance with another embodiment of the disclosed technique.

Reference is now made to FIG. 2B, which is a Venn diagram of the three network types sharing a physical layer of FIG. 2A, generally referenced 220, constructed and operative in accordance with another embodiment of the disclosed technique. Venn diagram 220 includes an outer circle 222 representing a common physical layer, a first network 224A, and a second network 224B. As shown, physical layer 222 is shared by first network 224A and second network 224B. First network 224A includes a plurality of devices 226A, 226B, 234A, 234B and master devices 228 and 236. Second network 224B includes a plurality of devices 230A, 230B, 234A, 234B and a plurality of master devices 232 and 236. Devices 226A, 226B and master device 228 are of a first network type (i.e., they use a first protocol for data transmission). Devices 230A, 230B and master device 232 are of a second network type (i.e., they use a second protocol for data transmission). Devices 234A, 234B and device 236 are of a third network type (i.e., they use a third protocol for data transmission). As mentioned above, device 236 can be referred to as a coordinator device.

Referring back to FIG. 2A, the third network type will now be described. As can be seen in FIG. 2B, the third network type can be part of two different networks, each network including a plurality of devices, each using a different protocol. The protocol of the third network type thus enables the devices of the third network type to communicate with at least the master of the first network and with the master of the second network. In general, the protocol of the third network type is defined as a superset of one of the other network type protocols.

For example, the third network type protocol may be defined as a superset of the first network type protocol, meaning the third network type protocol includes all the features and definitions of the first network type protocol. As a concrete example, if the first network type protocol is G.HN, then the third network type protocol may be defined as a superset of the G.HN protocol. In addition, the third network type protocol is defined to have backwards compatibility with the other network type protocols of the other network types. For example, the third network type protocol may be defined as having backwards compatibility with the second network type protocol, meaning the third network type protocol can encode its messages and data transmission, according to the definitions of the second network type protocol. As a concrete example, if the second network type protocol is HPNA3.1, then the third network type protocol may be defined as being backwards compatible with the HPNA3.1 protocol. As described later on in FIG. 8 according to the disclosed technique, the third network type protocol can encode data transmissions according to the HPNA3.1 protocol, and also according to the third network type protocol as encapsulated data transmissions, such that second network type devices do not read such data transmissions. In general, backwards compatibility refers to the ability of the devices using a particular protocol to encode data transmissions such that the devices using a different protocol can receive and understand the data transmissions. Sometimes backwards compatibility refers to different versions of a particular protocol where newer versions can encode data transmissions, such that older versions can understand them even though the older versions may be lacking certain features of the newer versions.

Backwards compatibility between protocols can also be referred to as interoperability between protocols. As an example used throughout the rest of the detailed description of the disclosed technique, the term coordinated G.HN, herein abbreviated CG.HN, is used to describe the standard of the third network type which is backwards compatible to the HPNA3.1 protocol, and which can also communicate using the G.HN protocol.

Figure 3:
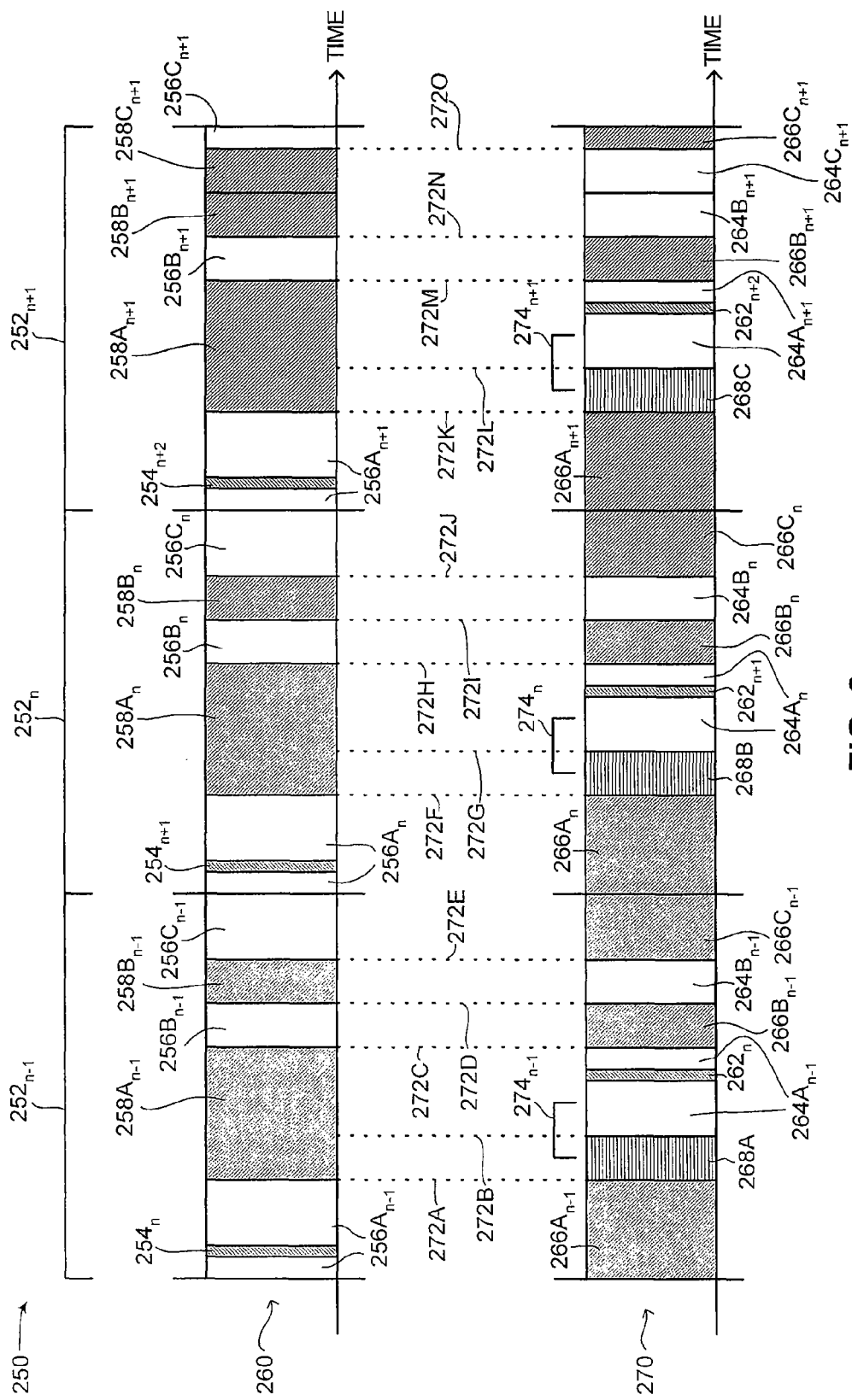
FIG. 3 is a schematic illustration of different network types synchronized and coordinated over a common physical layer, constructed and operative in accordance with a further embodiment of the disclosed technique.

Reference is now made to FIG. 3, which is a schematic illustration of different network types coordinated over a common physical layer, generally referenced 250, constructed and operative in accordance with a further embodiment of the disclosed technique. The network types in FIG. 3 (not shown) are substantially similar to the network types and the general setup of FIGS. 2A and 2B. In such a setup, there may be a plurality of first network type devices, such as HPNA3.1 devices, a plurality of second network type devices, such as G.HN devices, and a plurality of third network type devices, such as CG.HN devices.

Using this example, the HPNA3.1 devices and the CG.HN devices form a first network, whereas the G.HN devices and the CG.HN devices form a second network. One of the CG.HN devices is defined as a coordinator device. Recall that the CG.HN devices are part of both networks. The coordinator device synchronizes the transmission cycles of both networks (i.e., it at least determines the difference in the length of the two transmission cycles and the relative time shift and time drift between the starting times of the transmission cycles), and coordinates both networks such that a plurality of time slots are available for each network to transmit data. This is described in further detail below. Furthermore, once coordination is achieved between the two networks, the coordinator device maintains this coordination, as described below. In general, the following communication protocols are defined for communication between each type of network device over the two networks as shown in Table 1.

TABLE 1

Communication Protocols Between Network Types

| Types of Network Devices Communicating | Communication Protocol |
|---|---|
| HPNA3.1 to HPNA3.1 | HPNA3.1 protocol |
| CG.HN to CG.HN | G.HN protocol or a modified G.HN protocol |
| G.HN to G.HN | G.HN protocol |
| CG.HN to G.HN | G.HN protocol |
| CG.HN to HPNA3.1 | HPNA3.1 protocol |
| G.HN to HPNA3.1 | No communication |

The modified G.HN protocol is described further below with reference to FIGS. 7 and 8. In general, as mentioned above, a protocol defines the cycles in which data may be transmitted over the network. In the case of HN protocols, these cycles are referred to as media access control (herein abbreviated MAC) cycles. Also MAC cycles usually include a special time slot, for transmitting messages known as a multiple access protocol (herein abbreviated MAP) frame, which substantially describes how the time slots of next cycle are allocated. In centralized managed networks, the master device of the network defines the MAP frame. FIG. 3 shows the MAC cycles of the two networks, and how their various time slots are coordinated such that the data transmissions of one network do not interfere with the data transmissions of the other network. Coordinated different network types 250 include a plurality of MAC cycles 260 and 270. MAC cycles 260 show the time slot allocations of the first network, and MAC cycles 270 show the time slot allocations of the second network.

MAC cycles 260 include MAC cycles $252_{n-1}$, $252_n$ and $252_{n+1}$ and MAP frames $254_n$, $254_{n+1}$ and $254_{n+2}$. Each of the MAC cycles includes a MAP frame which describes the allocation of time slots for the next cycle. In general, the master device of the first network is an HPNA3.1 device. For example, MAP frame $254_n$, which is situated at the beginning of MAC cycle $252_{n-1}$, describes the time allocation of the first network for MAC cycle $252_n$. MAP frame $254_{n+1}$, which is situated at the beginning of MAC cycle $252_n$, describes the time allocation of the first network for MAC cycle $252_{n+1}$. MAP frame $254_{n+2}$, which is situated at the beginning of MAC cycle $252_{n+1}$, describes the time allocation of the first network for MAC cycle $252_{n+2}$ (not shown).

Besides the MAP frame, each MAC cycles includes two different types of time slots. The first type is a time slot available to devices on the network for transmitting data, referred to as a transmission opportunity (herein abbreviated TXOP) time slot. The second type is a time slot allocated to the coordinator device (not shown) for coordinating use of the physical layer with the other network, referred to as a coordinator time slot. It is noted that these time slots may be made up of smaller time slots which are indivisible. Recall that the master device of the first network allocates the various time slots of each MAC cycle based on the protocol of the network, as well as the requests of particular devices on the first network. MAC cycle $252_{n-1}$, in the first network, includes TXOP time slots $256B_{n-1}$ and $256C_{n-1}$ as well as coordinator time slots $258A_{n-1}$ and $258B_{n-1}$. It is noted that MAP frame $254_n$ is considered a used TXOP time slot within TXOP $256A_{n-1}$, therefore the TXOP time slots on either side of the MAP frame are denoted using the same numeral. This is the case of all the MAP frames in FIG. 3. MAC cycle $252_n$ in the first network, includes TXOP time slots $256A_n$, $256B_n$ and $256C_n$ as well as coordinator time slots $258A_n$ and $258B_n$. MAC cycle $252_{n+1}$ in the first network includes TXOP time slots $256A_{n+1}$, $256B_{n+1}$ and $256C_{n+1}$ as well as coordinator time slots $258A_{n+1}$, $258B_{n+1}$ and $258C_{n+1}$.

MAC cycles 270 include the same MAC cycles as defined above viz. MAC cycles $252_{n-1}$, $252_n$ and $252_{n+1}$. MAC cycles 270 include MAP frames $262_n$, $262_{n+1}$ and $262_{+2}$. In general, the master device of the second network is a G.HN device. As can be seen in the example set forth in FIG. 3, the MAP frames for the second network appear later in time in the MAC cycles of the MAP frames for the first network. This is because the start of each MAC cycle is allocated for the MAP frame of the first network. As in the case of MAC cycles 260, MAP frame $262_n$, which is situated in the middle of MAC cycle $252_{n-1}$, describes the time allocation of the second network for MAC cycle $252_n$. MAP frame $262_{n+1}$, which is situated in the middle of MAC cycle $252_{n+1}$, describes the time allocation of the second network for MAC cycle $252_{n+1}$. MAP frame $254_{n+2}$, which is situated in the middle of MAC cycle $252_{n+1}$, describes the time allocation of the second network for MAC cycle $252_{n+2}$.

MAC cycle $252_{n-1}$ in the second network includes TXOP time slots $264A_{n-1}$ and $264B_{n-1}$ as well as coordinator time slots $266A_{n-1}$, $266B_{n-1}$ and $266C_{n-1}$. MAC cycle $252_n$ in the second network includes TXOP time slots $264A_n$ and $264B_n$ as well as coordinator time slots $266A_n$, $266B_n$ and $266C_n$. It is noted that coordinator time slot $266A_n$ is adjacent to coordinator time slot $266C_{n-1}$. MAC cycle $252_{n+1}$ in the second network includes TXOP time slots $264A_{n+1}$, $264B_{n+1}$ and $264C_{n+1}$ as well as coordinator time slots $266A_{n+1}$, $266B_{n+1}$ and $266C_{n+1}$. Recall that the master device of the first network, allocates the various time slots of each MAC cycle based on the protocol of the network, as well as the requests of particular devices on the first network. In general, as can be seen in FIG. 3, when the two networks are synchronized and coordinated, the TXOP time slots of the first network do not overlap any TXOP time slots of the second network.

In other words, if the first network has a TXOP time slot defined at a particular time, then the second network will have a coordinator time slot defined at the same particular time, which substantially guarantees that only the first network will attempt to transmit data and not the second one. The same holds vice versa (i.e., either simultaneously or sequentially). This can be seen in FIG. 3 via dotted lines 272A, 272C, 272D, 272E, 272F, 272H, 272I, 272J, 272K, 272M, 272N and 272O, which show that when a TXOP time slot is defined in one network, a coordinator time slot is defined in the other network.

In addition, recall that the coordinator device is a member of both networks. As shown in FIG. 3, the coordinator device may request from the master device of the second network extra bandwidth (i.e., more time slots), such that for a given time slot, neither the first network nor the second network has a TXOP time slot defined. This extra bandwidth can be referred to as a self-coordination time slot and is usually allocated at the beginning of a TXOP time slot of the second network. In FIG. 3, each cycle has a self-coordination time slot, defined as self-coordination time slots 268A, 268B and 268C. As can be seen by dotted lines 272B, 272G and 272L, the self-coordination time slots in the second network define time slots which overlap some of the coordinator time slots of the first network. The coordinator device uses the self-coordination time slots for various purposes. One purpose is to make bandwidth reservation requests of the first network on behalf of the second network. In other words, one purpose is to make bandwidth requests of the network which includes HPNA3.1 devices, for the other network which includes G.HN devices. As mentioned above the same holds vice versa (i.e., either simultaneously or sequentially). Another purpose is to send various required transmissions over the first network (i.e. over the HPNA3.1 network). A further purpose is to initiate the synchronization and coordination protocol of the second network with the first network and vice versa. In general, before each MAC cycle begins, the two networks, via the coordinator device, attempt to coordinate all the time slots of the next MAC cycle, such that there is no interference. In general, the coordination process involves the coordination of the MAP frame of the first network with the MAP frame of the second network, such that there are no conflicts of use over the physical layer. The coordination process is achieved by a coordination protocol which begins, as in the example of FIG. 3, in the middle of the MAC cycle of the second network. The coordination protocol for each MAC cycle is shown in FIG. 3, as coordination protocols $274_n$, $274_{n+1}$ and $274_{n+2}$. Coordination protocol $274_n$ is used to coordinate the MAP frames for MAC cycle $252_n$, coordination protocol $274_{n+1}$ is used to coordinate the MAP frames for MAC cycle $252_{n+1}$ and coordination protocol $274_{n+2}$ is used to coordinate the MAP frames for MAC cycle $252_{n+2}$.

When coordinating the use of the physical layer, the coordinator describes the MAP frame of the second network to the master of the first network by transmitting resource allocation requests to the master of the first network (i.e., according to the resources allocation request protocol of a device of the network of the first type). The master of the first network allocates resources to the second network according to the request of the coordinator. The coordinator describes the MAP frame of the first network to the master of the second network by transmitting resource allocation requests to the master of the second network (i.e., according to the resources allocation request protocol of a device of the network of the second type). The master of the second network allocates resources to the first network according to the request of the coordinator.

Alternatively, the coordinator describes the MAP frame of the first network to the master of the second network, and the MAP frame of the second network to the master of the first network according to a neighboring network protocol. According to the neighboring network protocol, two masters of neighboring networks (i.e., either sharing the same physical layer or interfering with the transmissions of each other) synchronize the transmission cycles thereof and coordinate the use of the physical layers so as not to interfere with the transmissions of each other. Thus, each master allocates resources to the other network. According to yet another alternative, one of the devices is defined as a Global Master. The global master synchronizes the transmission cycles and coordinates the use of the physical layer between the two networks by imposing on each master of each network the resources allocated to the other network.

According to one embodiment of the disclosed technique, when the coordinator coordinates the use of the physical layer between an HPNA3.1 network and a G.HN network, the coordinator describes the MAP frame of the G.HN network to the master of the HPNA3.1 network by transmitting resource allocation requests to the master of the HPAN3.1 network (i.e., since the HPNA3.1 does not support a neighboring network protocol). The coordinator transmits the resource allocation requests to the HPNA3.1 master according to the resources allocation request protocol of a device of the HPNA3.1 network. The particular protocol could be, for example, a translation of the G.HN MAP frame to a form which an HPNA 3.1 device can decode. The particular protocol could also be a more complex link layer protocol. The master of the HPNA3.1 network allocates resources to the coordinator (i.e., actually to the G.HN network) according to the resource allocation requests received thereby.

The coordinator describes the MAP frame of the HPNA3.1 to the G.HN master according to one of three alternatives. According to the first alternative, the coordinator describes the MAP frame of the HPNA3.1 to the G.HN master according the G.HN neighboring network protocol. Accordingly, the coordinator appears to the G.HN master as a master of a neighboring G.HN network, while actually 'representing' the HPNA3.1 network. Thus, when the G.HN master allocates resources to the coordinator, the G.HN master is actually allocating those resources to the HPNA3.1 network. According to the second alternative, the coordinator assumes the role of a global master and imposes the MAP frame of the HPNA3.1 network on the G.HN master. Thus, the G.HN master is forced to allocate resources to the HPNA3.1 network. According to the third alternative, the coordinator describes the MAP frame of the HPNA3.1 network to the master of the G.HN network by transmitting resource allocation requests to the master of the G.HN network according to the resources allocation request protocol of a device of the G.HN network. The master of the G.HN network allocates resources to the coordinator (i.e., actually to the HPNA3.1 network) according to the resource allocation requests received thereto. Once the synchronization and coordination protocol is over, the master device of the second network updates its MAP frame to reflect the MAP frame of the first network and vice versa.

Figure 4:
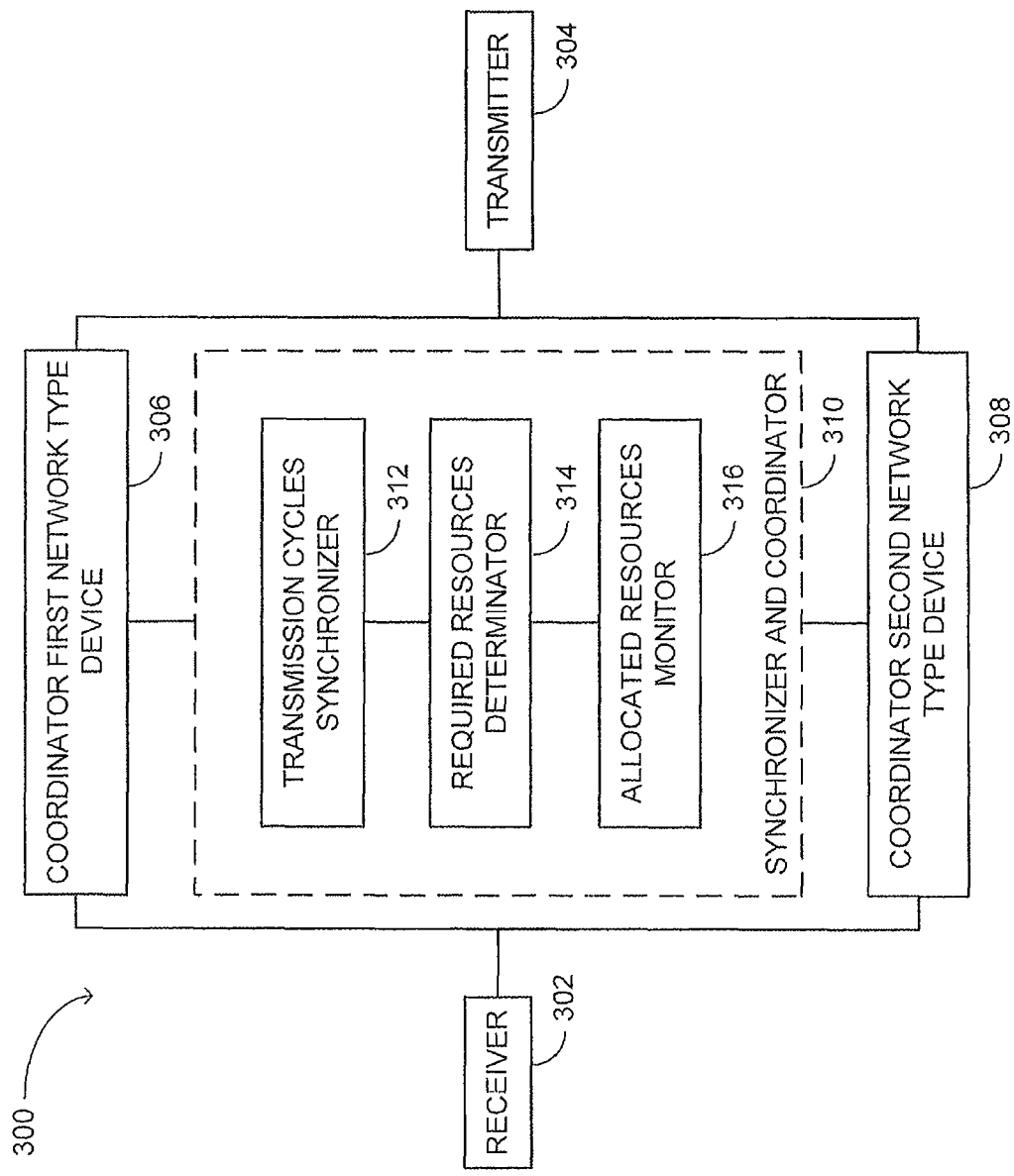
FIG. 4 is a schematic illustration of a coordinator in accordance with another embodiment of the disclosed technique.
Figure 5:
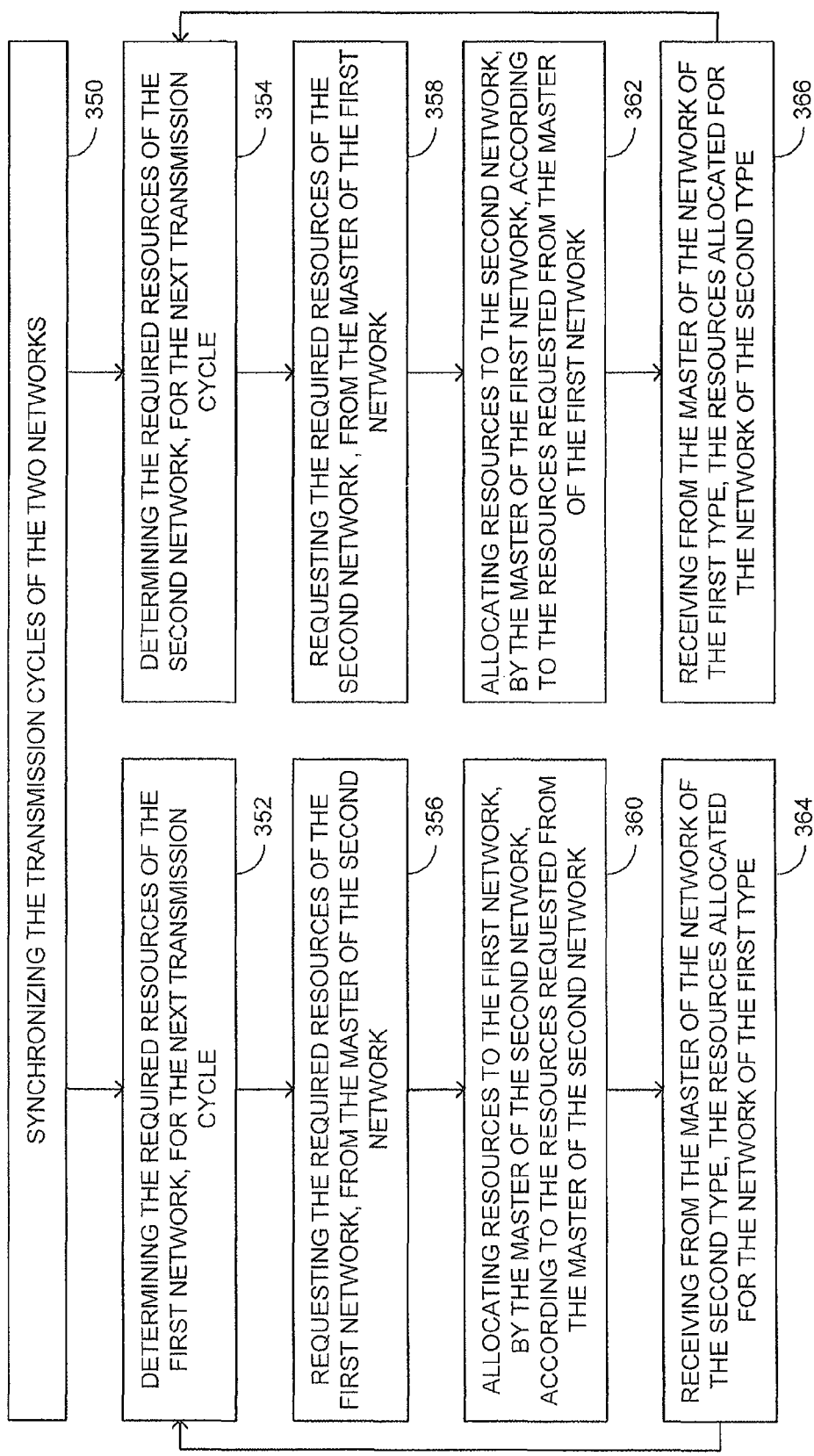
FIG. 5, is a schematic illustration of a method for synchronizing and coordinating two networks of different types over the same physical layer, in accordance with a further embodiment of the disclosed technique.

Reference is now made to FIG. 4 which is a schematic illustration of a coordinator, generally reference 300 in accordance with another embodiment of the disclosed technique. Coordinator 300 includes a receiver 302, a transmitter 304, a coordinator first network type device 306, a coordinator second network type device 308, and a synchronizer and coordinator 310. Synchronizer and coordinator 310 includes a transmission cycles synchronizer 312, a required resources determinator 314 and an allocated resources monitor 316. Synchronizer and coordinator 310 is coupled with coordinator first network type device 306 and with coordinator second network type device 308. Required resources determinator 314 is coupled transmission cycles synchronizer 312 and with allocated resources monitor 316. Transmitter 304 is further described in conjunction with FIG. 9. Receiver 302 is further described in conjunction with FIG. 10.

Transmission cycles synchronizer 312 synchronizes the transmission cycles of the two networks according to messages received by the coordinator first network type device 306 and coordinator second network type device 308. Synchronizing the transmission cycles of the two networks includes at least determining the difference between the time periods of the transmission cycles of the two networks and the shifts and the drifts between the starting times of the transmission cycles. Alternatively, coordinator 300 uses the neighboring network protocol (i.e., coordinator second network type device 308 assumes the role of a neighboring second network type master), and then transmission cycles synchronizer 312 determines the length and the start of the transmission cycles of the first network via first network type device. Transmission cycles synchronizer 312 provides the length and start to coordinator second network type device 308 which negotiates the length and the start of the transmission cycles with the master of the second network to equal that of the first network by using communication between the master of the first network and the master of the second network. Negotiation of the length and start of the transmission cycles between the masters of the two networks can also be executed by using the neighboring network protocol on the second network or by coordinator second network type device 308 assuming the role of a global master over the master device of the second network. When coordinator 300 assumes the role of a global master (i.e., coordinator second network type device 308 assumes the role of a global master), then, transmission cycles synchronizer 312 provides the length and start to coordinator second network type device 308 which imposes the length and the start of the transmission cycle of the first network on the second network. According to yet another alternative, coordinator and synchronizer 312 accounts for the different lengths of the transmission cycles and for the shifts and the drifts between the starts of the transmission cycles.

Once the transmission cycles of the two networks are synchronized, required resources determinator 314 determines the required resources of the first network and of the second network by receiving information relating to the use each network makes of the physical layer via coordinator first network type device 306 and coordinator second network type device 308, via receiver 302. When the first network is an HPNA3.1 network, then the required resources for the next cycle are determined by monitoring the activity on the HPNA3.1 network (e.g., according to acquired carrier sense information or according to HPNA3.1 MAP frames received by coordinator first network type device 306.

When the second network is a G.HN network, then, required resources determinator 314 determines the required resources of the second network for the next cycle according to either the global master protocol or the neighboring network protocol (i.e., coordinator second network type device 308 assumes the role of a neighboring G.HN master or of a global master). Then, required resources determinator 314 receives the required resources from coordinator second network type device 308, which receives these required resources from the G.HN master. Alternatively, required resources determinator 314 monitors the activity of the G.HN network (i.e., similar to the monitoring of the HPAN3.1 network mentioned above, for example, according to acquired carrier sense information or according to G.HN MAP frames received by coordinator second network type device 308).

Required resources determinator 314, provides the required resources of the second network to coordinator first network type device 306. Coordinator first network type device 306 transmits, to the master of the first network, via transmitter 304, a message requesting the determined required resource of the second network. Required resources determinator 314 provides the required resources of the first network to coordinator second network type device 308. Coordinator second network type device 308 transmits to the master of the second network, via transmitter 304, a message requesting the determined required resource of the first network. Allocated resources monitor 316 monitors the resources allocated to the first network by the master of the second network. Allocated resources monitor 316 also monitors the resources allocated to the second network by the master of the first network. Required resources determinator 314 may modify the required resources of each network accordingly.

It is noted that coordinator 300 may include at least one other coordinator network device coupled with synchronizer and coordinator 310. This other coordinator network device communicates with at least one device of another network type. Thus, coordinator 300 coordinates the use of the physical layer between multiple networks.

The following is a method according to which the coordinator device coordinates the use of the physical layer between two different network types. Reference is now made to FIG.

5, which is a schematic illustration of a method for synchronizing and coordinating two networks of different types over the same physical layer, in accordance with a further embodiment of the disclosed technique.

In procedure 350, the transmission cycles of the two networks are synchronized. As mentioned above, synchronizing the transmission cycles of the two networks includes at least determining the difference between the time periods of the transmission cycles of the two networks and the shifts and the drifts between the starting times of the transmission cycles. With reference to FIG. 4, transmission cycles synchronizer 312 synchronizes the transmission cycles of the two networks. When coordinator 300 uses the neighboring network protocol, then, transmission cycles synchronizer 312 synchronizes the transmission cycles of the two networks by negotiating (i.e., via coordinator second network type device 308) the length of the transmission cycles with the master of the second network. As an example, negotiations of the length of the transmission cycles can be executed using a cycle timer located in each network which manages the length of the transmission cycle and counts each cycle. The transmission of a MAP frame determines the beginning of the next cycle. Transmission cycles synchronizer 312 negotiates with the master devices on both networks to determine which transmission cycle will remain the same and which will be modified. In this example, the transmission cycle of the first network remains the same and the transmission cycle of the second network is modified. Transmission cycles synchronizer 312 then provides the master of the second network (via coordinator second network type device 308) with the length of transmission cycle of the first network, as coordinator 300, being a member of both networks, knows the length of each network's transmission cycles. The master of the first network then provides the master of the second network, via a special information frame, the current value of the cycle timer (i.e., where in the count of the cycle is the first network at). The master of the second network can then synchronize its transmission cycle to that of the first network. An example of such a frame is the MAP frame each master sends out to the nodes on its network such that each node can synchronize its cycle timer to the cycle timer of the master of the network. Thus, coordinator 300 causes the length of the transmission cycle of the second network to be equal to the length of the transmission cycle of the first network. When coordinator 300 assumes the role of a global master, then, transmission cycles synchronize 312 (i.e., via coordinator second network type device 308) imposes the length of the transmission cycle of the first network on the second network. Furthermore, transmission cycles synchronizer 312 determines the relative shift and drifts of the start of the transmission cycles of the two networks. The relative shift relates to the time difference between the starts of the transmission cycles and relative drift relates to the rate of change of this shift. When coordinator 300 does not employ the neighboring network protocol or the global master protocol, then, coordinator 300 accounts for the different lengths of the transmission cycles and the shifts and the drifts between the starts of the transmission cycles, according to the shift and the drift between the transmission cycles of the two networks determined by transmission cycles synchronizer 312.

In procedure 352 the required network resources of the first network, for the next transmission cycle, are determined. When the first network is an HPNA3.1 network, then the required resources for the next cycle are determined by monitoring the activity on the HPNA3.1 network (e.g., according to acquired carrier sense information or according to MAP frames). With reference to FIG. 4, required resources determinator 314 determines the required resources of the first network according to information relating to the use the first network makes of the physical layer received from coordinator first network type device 306. With reference to FIG. 2B, coordinator 236 determines the required resources of first network 224A.

In procedure 354 the required network resources of the second network, for the next transmission cycle, are determined. When the second network is a G.HN network, then, the required resources for the next cycle are determined by the coordinator device assuming the role of either a global master or a neighboring master in the G.HN network. Then, the coordinator receives the resources allocation information from the G.HN master. Alternatively, the coordinator device monitors the activity of the G.HN network (i.e., similar to the monitoring of the HPAN3.1 network mentioned above, for example, according to acquired carrier sense information). With reference to FIG. 4, required resources determinator 314 determines the required resources of second network according to information relating to the use the second network makes of the physical layer received from coordinator second network type device 308. With reference to FIG. 2B, coordinator 236 determines the required resources of second network 224B.

In procedure 356 the required resources for the first network are requested from the master of the second network. When the second network is a G.HN network, then the coordinator assumes the role of a global master according of the G.HN network. Then, the coordinator imposes the required resources of the first network on the master of the G.HN network (i.e., the G.HN master must allocate the required resources to the coordinator). Alternatively, the coordinator assumes the role of a neighboring G.HN master (i.e., according to the G.HN neighboring network protocol). Then the G.HN master and the coordinator coordinate the use of the physical layer according to the G.HN neighboring network protocol.

According to yet another alternative the coordinator assumes the role of a G.HN device and requests TXOPs from the G.HN master. With reference to FIG. 4, coordinator second network type device 308 transmits, via transmitter 304, a required resources request message, including the resources required for the first network to the master of the second network. With reference to FIG. 2B coordinator 236 requests the resources for network 224A of the first network type from master 232 of network 224B of the second type.

In procedure 358 the required resources for the second network are requested from the master of the first network. When the first network the first type is an HPNA3.1 network, then the coordinator assumes the role of an HPNA3.1 device and requests TXOPs from the HPNA3.1 master. With reference to FIG. 4 coordinator first network type device 306 transmits, via transmitter 304, a required resources request message, including the resources required for the second network to the master of the first network. With reference to FIG. 2B coordinator 236 requests the resources for network 224B of the second network type, from the master 228 of the network 224A of the first type.

In procedure 360, resources are allocated to the first network by the master of the second network, according to the resources requested from the master of the second network. With reference to FIG. 2B, master 232 of second network 224B allocates resources to coordinator 236 and thus allocates resources to first network 224A, according to the resources requested by coordinator 236 from master 232 of network 224B.

In procedure 362, resources are allocated to the second network by the master of the first network, according to the resources requested from the master of the first network. With reference to FIG. 2B, master 228 of first network 224A allocates resources to coordinator 236, and thus allocates resources to second network 224B, according to the resources requested by coordinator 236 from master 228 of first network 224A.

In procedure 364 the resources allocated for the first network are received from the master of the second network. For example, MAP frames from the master of the second network which includes the resources allocated for the network of the first type are received. With reference to FIG. 4, coordinator second network type device 308 receives, via receiver 302, the resources allocated for the first network, from the master of the second network (e.g., by receiving a first network type MAP frame). With reference to FIG. 2B, coordinator 236 receives the resources allocated for the network of the first type from master device 232.

In procedure 366 the resources allocated for the second network are received from the master of the first network. MAP frames from the master of the first network, which includes the resources allocated for the network of the second type are received. With reference to FIG. 4, coordinator first network type device 306 receives, via receiver 302, the resources allocated for the second network, from the master of the first network (e.g., by receiving a second network type MAP frame). With reference to FIG. 2B, coordinator 236 receives the resources allocated for the network of the second type from master device 228.

According to a further embodiment of the disclosed technique, the coordinator may monitor the reception of the resources and modify the resources allocation requests accordingly. For example, when the coordinator detects that the first network did not receive the required resources from the master of the second network, the coordinator will request from the master of the second network more resources than the first network actually requires. Thus, the coordinator may causes the second network to reduce the resources requirements thereof (i.e., since the transmission resources are finite). Alternatively, when the coordinator detects that the first network did not receive the required resources from the master of the second network, the coordinator may cause the first network to reduce the required resources thereof by requesting, from the master of the first network, more resources than the second network actually requires.

Similarly, when the coordinator detects that the second network did not receive the required resources from the master of first network, the coordinator will request from the master first network more resources than the second network actually requires. Alternatively, when the coordinator detects that the second network did not receive the required resources from the master of the first network, the coordinator may cause the second network to reduce the required resources thereof by requesting, from the master of the second network, more resources than the first network actually requires.

Referring back to FIG. 3, MAC cycles $252_{n-1}$ and $252_n$ are substantially similar in terms of their allocation of TXOP time slots, coordinator time slots and self-coordination time slots. MAC cycle $252_{n+1}$ shows a slightly different allocation scheme. Compared with the first of the two MAC cycles, for example, in the first network, an additional coordinator time slot has been allocated, namely coordinator time slot $258C_{n+1}$. Similarly, in the second network, an additional TXOP time slot has been allocated, namely TXOP time slot $264C_{n+1}$. In general, if the synchronization process in the second network ends before the MAP frame of the second network is transmitted, then any modification to the MAP frame of the first network can be taken into account, and modified in the second network MAP frame to avoid interference.

For example, in MAP frame $254_{n+1}$, an additional coordinator time slot, namely coordinator time slot $258C_{n+1}$, was allocated. Once the MAP frame for the first network has been transmitted, the synchronization protocol of the second network begins, during which the second network is made aware of the change in the MAP frame of the first network. Since the synchronization protocol ends before the MAP frame of the second network is transmitted, the MAP frame of the second network, namely MAP frame $262_{n+1}$, can be updated to include an additional TXOP time slot, namely TXOP time slot $264C_{n+1}$, as shown in FIG. 3.

It is noted that, in the example set forth in FIG. 3, the coordination process in the second network may sometimes end after the MAP frame of the second network has already been transmitted. In such a scenario, modifications to the MAP frame of the first network may not be taken into account and modified in the second network MAP frame, which may possibly cause interference on the physical layer. In order to reduce this effect, the coordinator device may request more bandwidth from the master device of the first network than actually needed by the second network. The extra bandwidth requested by the coordinator device from the first network substantially limits the changes to the MAP frame of the first network which the master device of the first network can execute, thereby reducing the chances of interference.

Recall that the setup of FIG. 3 includes a single physical layer which supports two networks: a first network, for example, an HPNA3.1 network, including two network type devices, for example, HPNA3.1 devices and CG.HN devices, and a second network, for example, a G.HN network, including two network type devices, for example, G.HN devices and CG.HN devices, with one network type device, for example CG.HN, being common to both networks. One of the CG.HN devices acts as a coordinator which enables the HPNA3.1 devices and the G.HN devices to coexist on the single physical layer, substantially without interference. In one embodiment of the disclosed technique, this setup requires transmission power management for coexistence between the two networks to occur (i.e., the devices in one network type may be required to adjust the transmission power thereof to match the power characteristic of the devices in the other network type). In another embodiment of the disclosed technique, no transmission power management is required for coexistence between the two networks to happen. In an embodiment of the disclosed technique, in this setup, if more than one of the third type of network device is present, then even though only one coordinator device is required which is of the third type of network device, all devices which are of the third network type are registered and part of both networks. In other words, all third network type devices are interoperable with both the first network type devices and the second network type devices. As mentioned in Table 1, in this embodiment, when devices of the third network type communicate with each other, they can choose whether to communicate using the protocol of the first network type, for example a modified G.HN protocol which encapsulates data transmissions to appear similar to the data transmissions according to the HPNA3.1 protocol, or of the second network type, for example the G.HN protocol. Two factors may influence which protocol third network type devices may use to communicate. One factor is that the G.HN protocol is more efficient than the modified G.HN protocol since it does not include an encapsulation. If the third network type devices are limited in terms of time slots for data transmissions, then using the G.HN protocol for communication may be more preferable since it requires less time slots per data transmission. Another factor is the setup of the two networks to which the third network type devices belong to. If a majority of the devices over both networks are operating using the HPNA3.1 protocol, then the third network type devices may use the modified G.HN protocol. If a majority of the devices over both networks are operating using the G.HN protocol, then the third network type devices may use the G.HN protocol.

In general, various devices on a network may request services from other devices on the network. Since HPNA3.1 devices can only communicate with HPNA3.1 devices, and since G.HN devices can only communicate with G.HN devices, then establishing a new link for a service in either one of those networks is simple as the protocol for communication in each network is already defined. If a device requests a service from a CG.HN device, the CG.HN device needs to identify what type of network device is requesting the service before establishing a link for the service to that device. The device requesting the service can be referred to as a destination device. For example, since CG.HN devices are part of the two networks and can communicate with devices on each network, the destination device may be an HPNA3.1 device, a CG.HN device or a G.HN device. If the type of network device of the destination device is known, then the CG.HN device can establish a link for the service with the destination device using the appropriate communication protocol as described above in Table 1. If the type of network device of the destination device is not known, then the CG.HN device attempts to establish a link for the service in both networks, transmitting a request to establish a link communication in each network according to the communication protocol appropriate for that network as described above in Table 1. Once the type of the destination device is identified, the CG.HN device knows which protocol to use to communicate with the destination device. It is assumed here that the address of the destination device (i.e., the location from which the initial request for service came from), can be identified in only one device. Therefore, if the device is identified on the first network, it is not identified on the second network. In general, the protocol of the third type of network devices, for example, the CG.HN protocol, supports multicast as well as broadcast transmissions. If a multicast group of a CG.HN device includes devices from both networks, such as HPNA3.1 devices and G.HN devices, then the CG.HN device may divide the multicast group into two multicast subgroups: at least one for devices in the G.HN network and one for devices in the HPNA3.1 network. The CG.HN device would then transmit the multicast transmission twice, one in each network according to the communication protocol of that network.

FIG. 3 shows the MAC cycles of two networks already synchronized. As mentioned above, the method by which the two networks become synchronized and coordinated via the coordinator device will now be described. In one embodiment of the disclosed technique, the coordinator device uses a time division multiple access (herein abbreviated TDMA) scheme to define different TXOP time slots for each network. In this embodiment, the coordinator device decides (i.e., before each MAC cycle), how the different TXOP time slots will be allocated for each network. In another embodiment of the disclosed technique, the coordinator device uses a carrier sense multiple access (herein abbreviated CSMA) scheme for synchronizing the two networks. In a CSMA scheme, the coordinator device provides carrier sense information to both networks. Carrier sense information includes information regarding whether a device is currently transmitting data over the physical layer (i.e., the carrier) or not. Carrier sense information can be provided to each network by the coordinator device each time a device on one of the networks uses the physical layer. In this respect, other devices on the network would wait until a sensed data transmission finished before attempting to use the physical layer for transmitting a message. In general, synchronization and therefore coexistence between the two networks can be enhanced if devices of the second network type (e.g., G.HN devices) are enabled with a method for detecting transmissions from devices of the first network type (e.g., HPNA3.1 devices or CG.HN devices transmitting messages using the modified G.HN protocol). In other words, even if G.HN devices cannot decode the transmissions of devices on the first network, coexistence can be enhanced if G.HN devices can detect that such transmissions are occurring and that such transmissions are originating from devices on the first network and are not just noise and interference on the physical layer.

As described above, the two networks of FIG. 3, with the use of a third network type device, referred to as a coordinator device, can coexist at a medium level of coexistence. In general, networks are dynamic and various devices can join and leave networks at different points in time thereby transitioning the networks from one level of coexistence to another. For example, using the network types defined in FIG. 3, two different networks sharing a common physical layer may coexist at a low level. At some point in time, a coordinator device may join both networks and enable the two different networks to coexist at a medium level. As such, according to the disclosed technique, various combinations of network types will now be described as well as how these network types can transition between various levels of coexistence. In all these combinations of network types, it is assumed that only one physical layer exists and is used by all network types. The setup of networks in FIG. 3 will be referred to as a G.HN-CG.HN-HPNA3.1 network combination, these networks operating at a medium level of coexistence.

A first network combination includes devices of the second network type and the third network type, for example, G.HN devices and CG.HN devices. In this network combination, since each network type operates using a protocol which is fully compatible with the other protocol, even thought two network types are present in the network combination, only one network exists. In this network communication between all devices of the network occur using the G.HN protocol. The network types in this network combination can be referred to as coexisting at a high level since the devices of both network types can communicate with one another. This first network combination will be referred to as a G.HN-CG.HN network combination, these networks operating at a high level of coexistence.

A second network combination includes devices of the first network type and the third network type, for example, HPNA3.1 devices and CG.HN devices. In this network combination, since the third network type operates using a protocol which is backwards compatible with the protocol of the first network type, even thought two network types are present in the network combination, only one network exists. In this network combination, communication between the devices of the two network types is defined by the protocols according to Table 2.

TABLE 2

Communication Protocols Between the CG.HN
Network Type and the HPNA3.1 Network Type

| Types of Network Devices Communicating | Communication Protocol |
| --- | --- |
| HPNA3.1 to HPNA3.1 | HPNA3.1 protocol |
| CG.HN to CG.HN | modified G.HN protocol |
| CG.HN to HPNA3.1 | HPNA3.1 protocol |

The network types in this network combination can be referred to as coexisting at a high level since the devices of both network types can communicate with one another. This second network combination will be referred to as a CG.HN-HPNA3.1 network combination, these networks operating at a high level of coexistence. It is noted that in this network combination, MAC management information, such as MAP frames, are transmitted to the various devices on the network using the HPNA3.1 protocol.

A third network combination includes devices of the first network type and the second network type, for example, HPNA3.1 devices and G.HN devices. In this network combination, since each network type operates using a protocol which is not compatible at all with the other protocol, two networks exists in this network combination. In this network combination, no communication occurs between the devices of each network type. As mentioned above, each network type perceives communications of the other network type as interference over the physical layer. The network types in this network combination can be referred to as coexisting at a low level since the devices of each network types do not communicate with one another. This third network combination will be referred to as an HPNA3.1-G.HN network combination, these networks operating at a low level of coexistence.

First, the transition of each of a G.HN-CG.HN network combination, a CG.HN-HPNA3.1 network combination and a HPNA3.1-G.HN network combination to a G.HN-CG.HN-HPNA3.1 network combination will be described. It is noted that in each of these transitions, a device (or devices) of a network type, different than the current network types existing on the physical layer, joins the network combination. The process by which a device joins a network is referred to as a registration process, which is described further below. Second, the transition of a G.HN-CG.HN-HPNA3.1 network combination to each of a G.HN-CG.HN network combination, a CG.HN-HPNA3.1 network combination and a HPNA3.1-G.HN network combination will be described.

As described above, a G.HN-CG.HN network combination operates using the G.HN protocol. To transition to a G.HN-CG.HN-HPNA3.1 network combination implies that an HPNA3.1 device tries to register and join the network combination. Once the HPNA3.1 device registers, as described below, and is part of the network combination, one of the CG.HN devices becomes a coordinator device for coordinating time usage of the physical layer between the G.HN devices and the HPNA3.1 device. In one embodiment of the disclosed technique, prior to an HPNA3.1 device registering onto the network combination, the coordinator device is the master device for the HPNA3.1 device. In another embodiment of the disclosed technique, once the HPNA3.1 device registers onto the network combination it becomes the master device, the coordinator device becomes a member of the first network (i.e., the network of HPNA3.1 devices and CG.HN devices) and relays information about TXOP time slots reserved by G.HN devices to the HPNA3.1 master device. The coordinator device will allocate TXOP time slots to the HPNA3.1 device on the physical layer only after the G.HN master device has reserved the TXOP time slots it needs per MAC cycle.

In general, in order for an HPNA3.1 device to join a network, three requirements of the existing network need to be met. First, the HPNA3.1 device needs to receive a special frame, known as a legacy registration MAP frame (herein abbreviated LRMAP), which describes to the device who the master device is and how the resources are allocated in the next frame. The LRMAP frame is to be transmitted at least once every 55 milliseconds (herein abbreviated msec) using a protocol which the HPNA3.1 device can decode. In other words, the existing network, the G.HN-CG.HN network combination, is required to transmit an LRMAP frame every 55 msec to enable an HPNA3.1 device to join the network combination. Second, a quiet frame, of a predetermined amount, for example on the order of microseconds (herein abbreviated μsec), in which no data transmissions occur on the physical layer, should be allocated prior to the LRMAP frame in order to ensure the proper reception of the LRMAP frame by the HPNA3.1 device. Third, a TXOP registration time slot in the MAC cycle of the existing network needs to be allocated for the registration of the HPNA3.1 device to the network combination.

According to a first embodiment of the disclosed technique, the G.HN-CG.HN network combination meets the above mentioned requirements by using a pseudo-neighboring network technique. In the pseudo-neighboring network technique, the coordinator device appears to the G.HN master device on the G.HN-CG.HN network combination as a master device of a neighboring G.HN network. This can be done by the coordinator device by using the neighboring network protocol and the neighboring network toolkit specified in the G.HN standard. Recall that the master device of a first G.HN network can communicate with the master device of a second G.HN network and coordinate the use of a physical layer, or an adjacent physical layer, between each of the networks. The coordinator device will transmit a G.HN frame to the G.HN master device, requesting a TXOP time slot once every 55 msec. This TXOP time slot will be used for the quiet frame requirement, the LRMAP frame requirement and the TXOP registration time slot requirement for the HPNA3.1 device to join the network combination. Alternatively, the G.HN-CG.HN network combination meets the above mentioned requirements by the one of CG.HN devices assuming the role of a global master and imposing a TXOP time slot once every 55 msec on the G.HN master for the CG.HN coordinator device. In general, the G.HN devices on the network combination will relate to the LRMAP frame as a corrupted transmission from the neighboring G.HN network. The LRMAP frame will be transmitted using the HPNA3.1 protocol.

According to a second embodiment of the disclosed technique, the G.HN-CG.HN network combination meets the above mentioned requirements by using an expanded time slot technique. In the expanded time slot technique, the coordinator device requests a time slot to be reserved thereto from the G.HN master device. This expanded time slot includes the quiet frame requirement and the TXOP registration time slot requirement as well as the LRMAP frame required for the HPNA3.1 device to join the network combination. As in the previous embodiment, the coordinator device transmits the LRMAP frame. In order to ensure that the LRMAP is transmitted at least once every 55 msec, the coordinator device may request more time slots than needed each MAC cycles, which can be a source for inefficiency in the network combination if the extra requested time slots are not used. In general, two potential issues may arise in this embodiment. The first issue is that the quiet frame and the TXOP registration time slot are both time slots in which the coordinator device does not transmit any data. Since no data is being transmitted in these time slots, other G.HN devices on the network combination may consider these time slots unused and may transmit data, thereby interfering with the registration process of the HPNA3.1 device. The second issue is that G.HN devices do not know how to relate to the transmission of the LRMAP frame in the HPNA3.1 protocol. G.HN devices may think that the LRMAP frame is a corrupt data transmission and may request a retransmission of the LRMAP frame.

According to the second embodiment, both of these issues are resolved if the coordinator device transmits a small amount of data using the G.HN protocol, referred to as a G.HN frame, at the beginning of the time slot it requested from the G.HN master device. G.HN devices will receive this frame and understand that the time slot requested by the coordinator device is being used. Also, virtual carrier sense (VCS) information located in the header (i.e., the start) of the G.HN frame may signal to the G.HN devices that a time slot equal to the quiet frame, the LRMAP frame and the TXOP registration time slot is being used and that the G.HN devices should not transmit any data during this time slot. It is assumed that the G.HN devices treat the time slot of the registration process of the HPNA3.1 device as a single G.HN time slot with bad cyclic redundancy check (herein abbreviated CRC), even though it includes a transmission using the HPNA3.1 protocol, i.e., the LRMAP frame. The frame check (herein abbreviated FC) of this time slot should prevent G.HN devices from requesting a retransmission of the LRMAP frame. It is noted that this embodiment may require a certain amount of overhead in terms of time resources of the physical layer.

According to a third embodiment of the disclosed technique, the G.HN-CG.HN network combination meets the above mentioned requirements by using a TXOP technique. In the TXOP technique, the coordinator device requests a TXOP time slot from the G.HN master device. This TXOP time slot is used for the quiet frame, the LRMAP frame and the TXOP registration time slot. As in the previous embodiments, the coordinator device transmits the LRMAP frame. As in the second embodiment, the coordinator device may transmit a G.HN frame at the beginning of the TXOP time slot to resolve the issues described above, viz. G.HN devices cannot decode LRMAP frames and G.HN devices transmitting data during the quiet frame or the TXOP registration time slot.

It is noted that the first embodiment described above resolve the issues described in the second and third embodiments above. Also, the first embodiment uses existing methods which are part of the G.HN protocol. It is noted that to use the first embodiment, the G.HN protocol must include a method for coordinating the allocation of time over a physical layer or adjacent physical layers between two master devices. If such a method is not included in a particular embodiment of the G.HN protocol then such a method needs to be defined. The second embodiment described above does not make use of more complex features of the G.HN protocol, such as the neighboring network toolkit, although it involves a certain amount of overhead. In this embodiment, since the coordinator device can request more time slots than needed and only use the ones it requires for a given MAC cycles, it appears relatively simple for the coordinator device to transmit the LRMAP frame as frequently as required for HPNA3.1 devices to join the network combination. The third embodiment described above involves overhead similar to the overhead involved in the second embodiment. Unlike the second embodiment, it may be more difficult in the third embodiment to guarantee a TXOP time slot every 55 msec for the registration process of the HPNA3.1 device.

As described above, a CG.HN-HPNA3.1 network combination operates using the HPNA3.1 protocol as well as a modified G.HN protocol. To transition to a G.HN-CG.HN-HPNA3.1 network combination implies that a G.HN device tries to register and join the network combination. In this transition, once the G.HN device registers onto the network combination, one of the CG.HN devices becomes a coordinator device. Also, once the G.HN device registers onto the network combination, the coordinator device becomes a master device for G.HN devices. The coordinator device allocates bandwidth (i.e., time slots) to G.HN devices only after the HPNA3.1 master device has reserved bandwidth for HPNA3.1 devices on the network combination.

In general, to register a G.HN device on a network, the following two requirements need to be met. The first requirement is the transmission of a G.HN MAP frame at least once in a predetermined time period. In other words, the existing network needs to transmit a G.HN MAP frame using the G.HN protocol so that G.HN devices can know how usage times have been allocated each MAC cycle. The second requirement is the allocation of a TXOP registration time slot for registering G.HN devices onto the network combination. The CG.HN-HPNA3.1 network combination meets these requirements by having the coordinator device request a TXOP time slot from the HPNA3.1 master device once every predetermined time period. During the time slot, the coordinator device transmits the G.HN MAP frame and also leaves time for a TXOP registration time slot for the G.HN devices. The HPNA3.1 master device considers this assignment of bandwidth to the coordinator device as if it were a constant bit rate (herein abbreviated CBR) transmission. It is noted that in this mode of operation, the G.HN device will receive HPNA3.1 transmissions. The G.HN device is expected to treat these transmissions as noise.

As described above, a HPNA3.1-G.HN network combination operates as two separate networks, with no communication between the networks. To transition to a G.HN-CG.HN-HPNA3.1 network combination implies that a CG.HN device tries to register and join each network and act as a coordinator device for synchronizing and coordinating the two different networks. It is noted that in general, in a HPNA3.1-G.HN network combination, each network may suffer from instability due to the lack of coexistence between the different networks over a common physical layer. The HPNA3.1 network may shift between managed and unmanaged modes of operation and the G.HN network may exhibit some instability and loss of MAP frames. In general, the CG.HN device attempting to join the network combination needs to first detect the two active networks and join each network and second, to synchronize the two networks and coordinate time usage of the common physical layer.

Regarding the HPNA3.1 network, the CG.HN device should first register onto the HPNA3.1 network. Once it is registered and part of the HPNA3.1 network, the CG.HN device, acting as a coordinator device, should transmit the HPNA3.1 MAP frame, or an HPNA3.1 master device selection protocol if an HPNA3.1 MAP frame is not detected, to the HPNA3.1 master device. Then, the coordinator device should request an allocation of a TXOP time slot for G.HN devices from the HPNA3.1 master device. Regarding the G.HN network, the CG.HN device should first register onto the G.HN network. Once it is registered and part of the G.HN network, the CG.HN device, acting as a coordinator device, should transmit a pseudo-neighboring network G.HN MAP frame to the G.HN master device. Then, the coordinator device should provide the G.HN master device with the contents of an HPNA3.1 MAP frame. In general the HPNA3.1 MAP frame is generated by the HPNA3.1 master device and transmitted by the coordinator device to the G.HN master device. As mentioned above, the coordinator device may appear to the G.HN master device as a master device of a neighboring G.HN network, or a relay device to another network. In either case, the coordinator device translates the contents of the HPNA3.1 MAP frame into a G.HN MAP frame which the G.HN master device can understand. As part of the synchronization process between the two networks, the MAC cycles of each network need to be synchronized, meaning their start times need to be synchronized in time. In one embodiment of the disclosed technique, the coordinator device can synchronize the two different networks by executing content modification, i.e. time-shifting, of the MAC cycles of one of the networks such that it is synchronized with the MAC cycles of the other network. In another embodiment of the disclosed technique, the coordinator device can add a G.HN time stamp to an HPNA3.1 MAP frame indicating the difference in start times between the MAC cycles of each network. In this embodiment, the G.HN master device would perform the calculations based on the time stamp to synchronize the MAC cycles of both networks.

As mentioned above networks are dynamic and various devices can join and leave networks at different points in time thereby transitioning the networks from one level of coexistence to another. What follows is a description of the transition of a G.HN-CG.HN-HPNA3.1 network combination to respectively a HPNA3.1-G.HN network combination, to a CG.HN-HPNA3.1 network combination and to a G.HN-CG.HN network combination.

When the coordinator device, (e.g., coordinator device 236 in FIG. 2B) in a G.HN-CG.HN-HPNA3.1 network combination is removed, the remaining devices using the physical layer are devices of the first and second type networks only (i.e., only G.HN and HPNA3.1 devices). Thus, the network combination is a HPNA3.1-G.HN network combination. As mentioned above the devices in these two network types exhibit a low level of coexistence (i.e., the devices of the two network types do not communicate there between). Accordingly, the master devices of both the network of first network type (i.e., the master device of the G.HN network) and the network of the second type do not receive transmissions from the coordinator device. Consequently the master devices transmit the respective MAP frames thereof allocating time slots in the entire transmission cycle. The master devices may wait for a determined time period (e.g., an integer number of cycles being either predetermined or dynamically determined according to network parameters such as Signal-to-Noise ratio or data traffic) before transmitting MAP frames allocating time slots in the entire transmission cycle to ensure the coordinator device was removed. The master device of the second type network (i.e., the master device of the HPNA3.1 network) will seize allocated bandwidth from the coordinator device and may allocate that bandwidth to other devices for other purposes.

When a device of the second type network, (e.g., device 230A in FIG. 2B), in a G.HN-CG.HN-HPNA3.1 network combination is removed, the remaining devices using the physical layer are devices of the first and third type networks only (i.e., only CG.HN and HPNA3 devices). Thus, the network combination is a HPNA3.1-CG.HN network combination. As mentioned above the devices in these two network types exhibit a high level of coexistence (i.e., the devices of the two network types communicate there between). When there is only a single third type network device (i.e., only one CG.HN device in the network) after the last G.HN device was removed the single remaining CG.HN device becomes a G.HN network type master device and detects that there are no other G.HN network type devices in the network combination. The remaining CG.HN device will request from the first network type master device (i.e., HPNA3.1 network type master device) bandwidth for itself and for G.HN network type devices that may join the network in the future. When there is more than one CG.HN network type device, the remaining CG.HN network type devices may form a G.HN network and thus the network combination remains, in fact, a G.HN-CG.HN-HPNA3.1 network combination. Alternatively, each CG.HN network type device starts transmitting according to the HPNA3.1 protocol (i.e., the coordinator device does not "decide" for CG.HN network type devices). CG.HN network type devices that provided services according to the G.HN protocol will conclude these services according to the G.HN protocol. CG.HN network type devices will establish new services according to the HPNA3.1 protocol.

When a device of the first type network, (e.g., device 226A in FIG. 2B), in a G.HN-CG.HN-HPNA3.1 network combination is removed, the remaining devices using the physical layer are devices of the second and third type networks only (i.e., only CG.HN and G.HN devices). Thus, the network combination is a G.HN-CG.HN network combination. As mentioned above the devices in these two network types exhibit a high level of coexistence (i.e., the devices of the two network types communicate there between). When there is only a single third type network device (i.e., only one CG.HN device in the network) after the last HPNA3.1 device was removed, the single remaining CG.HN device becomes a G.HN network type master device and requests bandwidth from the other G.HN master device for HPNA3.1 network type devices that may join the network in the future. When there is more than one CG.HN network type device, the remaining CG.HN network type devices will join the existing G.HN network.

As described herein above, according to the disclosed technique, a first type network (e.g., an HPNA3.1 network), can coexist (i.e., both networks share the same physical layer) with a second network type (e.g., a G.HN network). The two networks can coexist since a device from a third network type coordinates the operation of the first and the second network types. For the convenience of the discussion that follows, the term 'legacy network' refers to a network including a plurality of devices of the first type of network. The devices of the first network type are referred to as 'legacy devices'. The term 'native network' refers to a network which includes a plurality of devices from the third network type. Devices of the third network type are referred to as 'native devices'. The term 'mixed network' refers to a network which includes a plurality of legacy devices and native devices (i.e., there are devices of the third network type).

Figure 6:
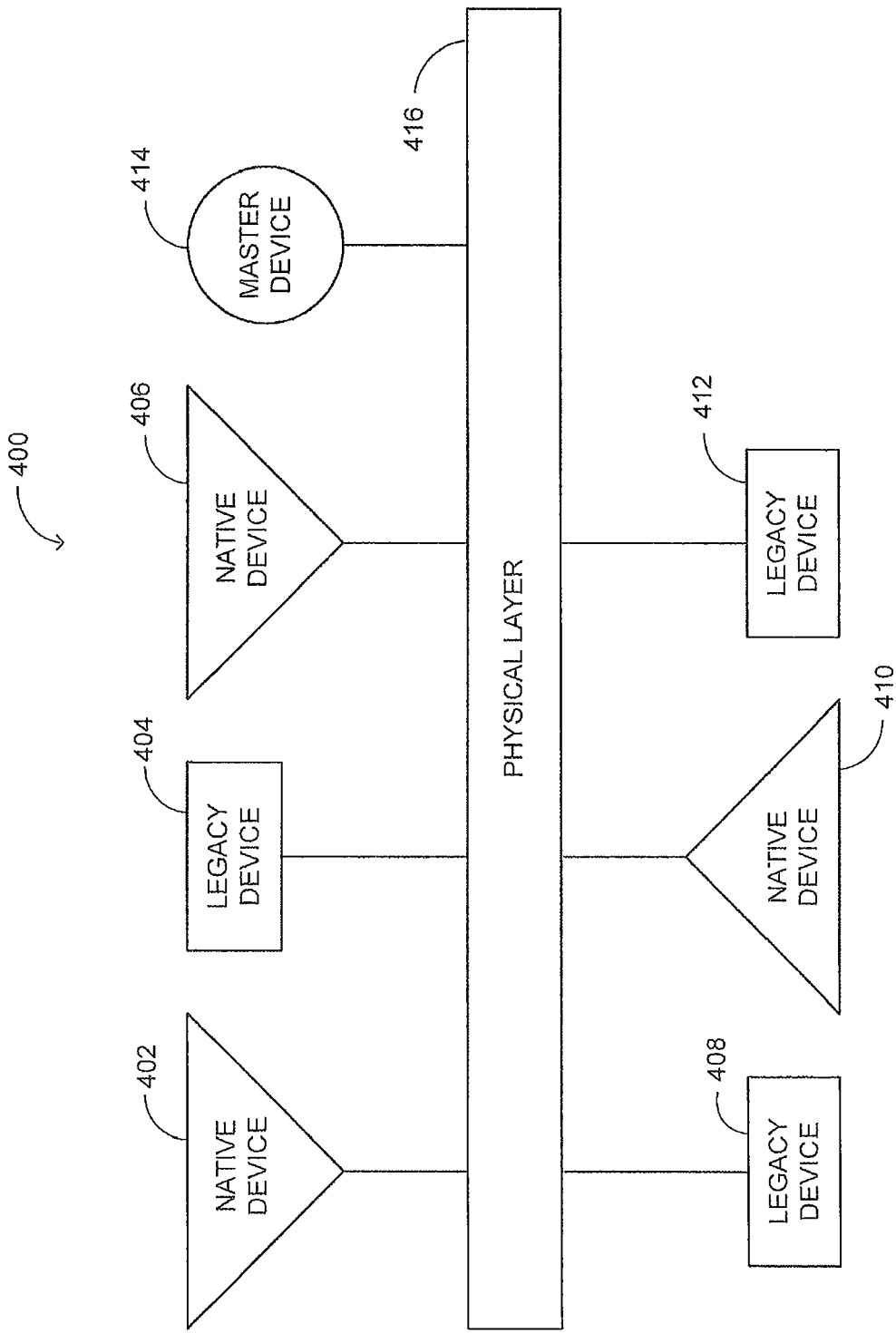
FIG. 6 is a schematic illustration of a mixed network, constructed and operative in accordance with another embodiment of the disclosed technique.

Reference is now made to FIG. 6 which is a schematic illustration of a mixed network, generally referenced 400, constructed and operative in accordance with another embodiment of the disclosed technique. Network 400 includes a plurality of native devices 402, 406 and 410, a plurality of legacy devices 404, 408 and 412, a master device 414 and a physical layer 416 (e.g., power line, phone line, COAX cable). Master device 414 may be either a legacy device or a native device. Native devices 402, 406 and 410, legacy devices 404, 408 and 412 and master device 416 are all coupled with physical layer 416.

In general, a native device, such as native devices 402, 406 or 410 (FIG. 6), operates in one of three modes:

Native mode—the native device operates according to the protocols of the second network type (e.g., G.HN);

Legacy mode—the native device operates according to the legacy network configuration (e.g., HPNA3.1); and Mixed mode—the native device operates according to the protocols of the second network, and at least a part of the legacy network protocol (e.g., modified G.HN).

When a native device operates in the native mode, the native device operates according to the second network type protocol. Therefore, the native device transmits a second network type MAP frame at every transmission frame of the second network type. Furthermore, the native device transmits a legacy MAP frame at every transmission frame of the legacy network. Thus, when a legacy device initiates a request to join a native network, the legacy device receives the legacy MAP frame from the coordinator device (i.e., master device 414), allowing the legacy device to determine the transmission opportunities thereof (e.g., when the type B device can start transmitting). The legacy device can then start transmitting accordingly.

Figure 7:
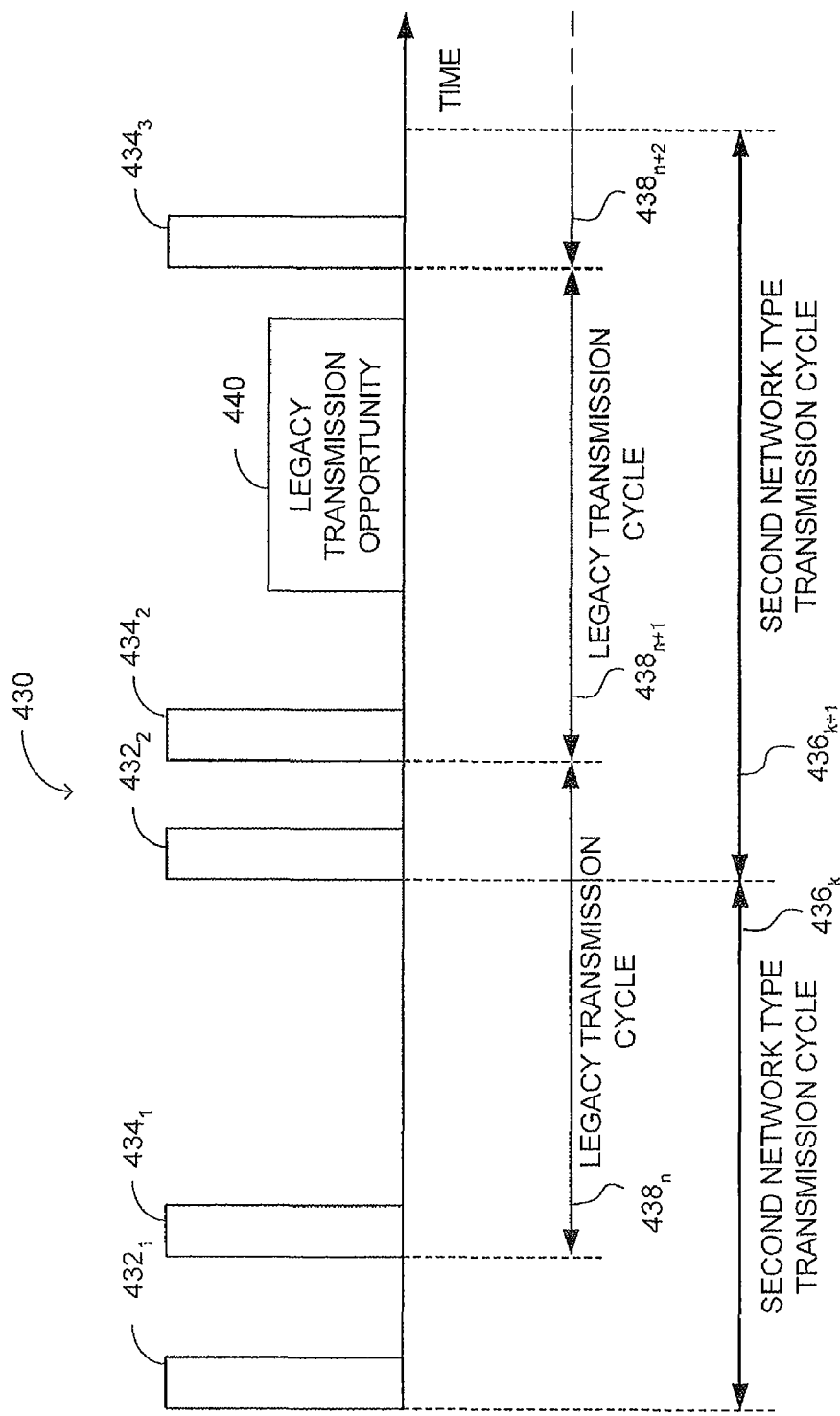
FIG. 7 is a schematic illustration of exemplary transmission cycles in a native network, constructed and operative in accordance with a further embodiment of the disclosed technique.

Reference is now made to FIG. 7, which is a schematic illustration of a plurality of exemplary transmission cycles, generally referenced 430 in a native network, constructed and operative in accordance with a further embodiment of the disclosed technique. A native device transmits second network type MAP frames $432_1$ and $432_2$ at second network type transmission cycles $436_k$ and $436_{k+1}$, respectively. The native device transmits legacy MAP frames $434_1$, $434_2$ and $434_3$ at each of a plurality of legacy transmission cycle $438_n$, $435_{n+1}$, $438_{n+2}$. Thus, a legacy device is capable of receiving a plurality of MAP frames $434_1$-$434_3$. In FIG. 7, MAP frame $434_1$, which is transmitted in legacy transmission cycle $438_n$, determines the resources allocation of legacy transmission cycle $438_{n+1}$. Consequently, a legacy device is capable of determining transmission opportunity 440 according to received MAP frame $434_1$. Thus, the network transforms from a native network to a mixed network, and the type NB devices commence operating in the mixed mode.

When the native devices operate in the mixed mode (i.e., in a mixed network), these native devices may be required to communicate there between. As mentioned above, in general, the native devices operate according to the protocols of the second network type. However, when operating in the mixed mode, the native devices encapsulate the transmission frames thereof with a legacy frame header and a trailer. Accordingly, the legacy devices detect that the physical layer is used and do not use the medium.

Figure 8:
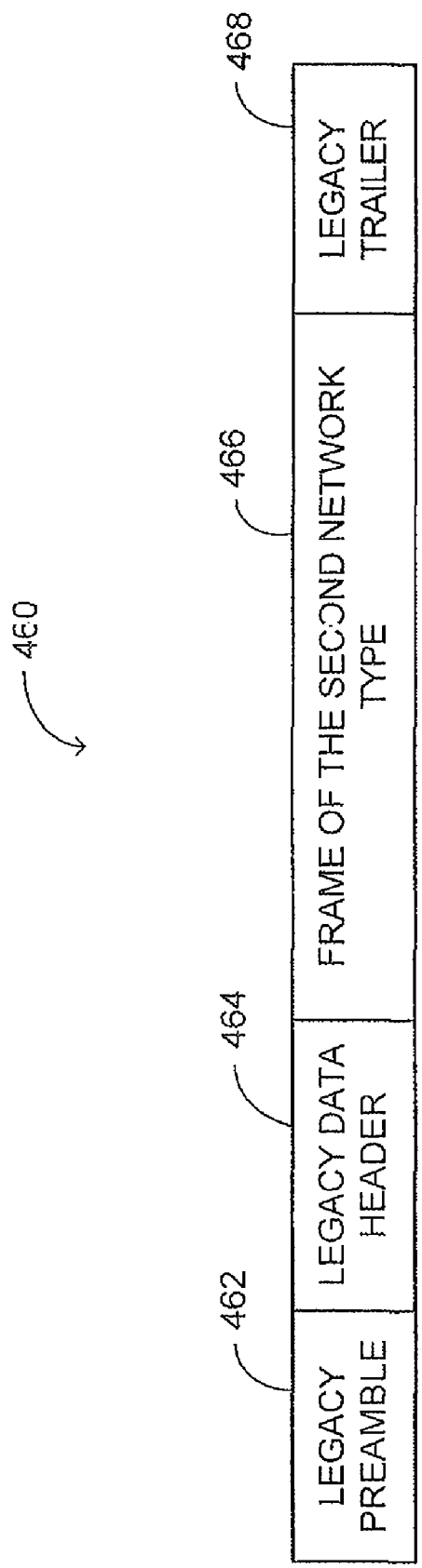
FIG. 8 is a schematic illustration of a transmission frame, transmitted by one native device to another native device in a mixed network, constructed and operative in accordance with another embodiment of the disclosed technique.

Reference is now made to FIG. 8, which is a schematic illustration of a transmission frame, generally referenced 460, transmitted by one native device to another native device in a mixed network, constructed and operative in accordance with another embodiment of the disclosed technique. A frame 466 of the second network type is encapsulated in legacy preamble 462, legacy data header 464 and legacy trailer 468 of the first network type.

Figure 9:
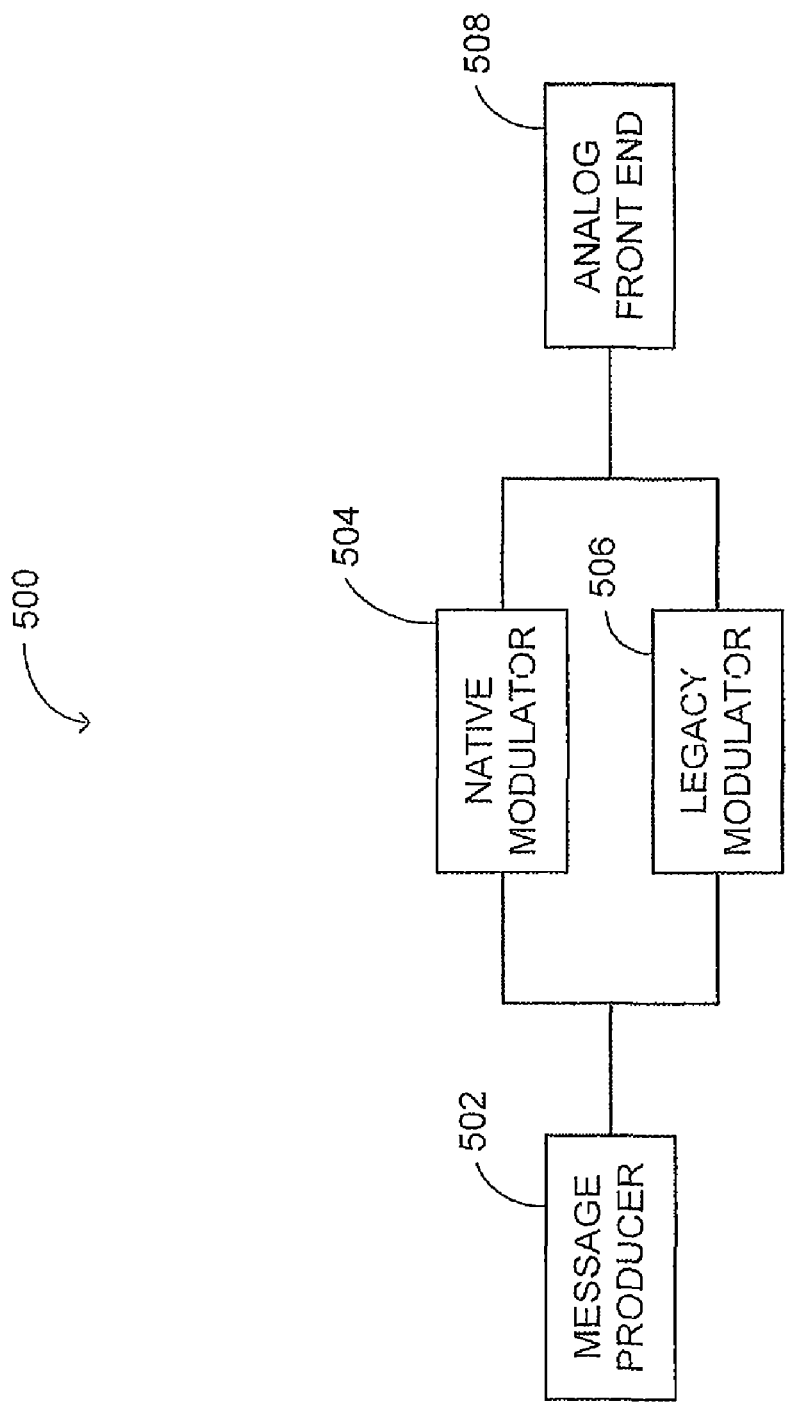
FIG. 9 is a schematic illustration of a transmitter of a native device, constructed and operative in accordance with a further embodiment of the disclosed technique.

Reference is now made to FIG. 9, which is a schematic illustration of a transmitter, generally referenced 500, of a native device, constructed and operative in accordance with a further embodiment of the disclosed technique. System 500 includes a message producer 502, a native network modulator 504, a legacy network modulator 506 and an analog front end 508. Message producer 502 is, for example, coordinator first network type device 306 (FIG. 4) or coordinator second network type device 308 (FIG. 4). Native network modulator 504 is coupled with message producer 502 and with analog front end 508. Legacy network modulator 506 is also coupled with message producer 502 and with analog front end 508. Message producer 502 produces messages for transmission (e.g., a native MAP frame, a legacy MAP frame, a data message, bandwidth demand message and the like).

When the message is transmitted to a native device (not shown), message producer 502 provides the message to native modulator 504. When the message is transmitted to a legacy device (not shown), message producer 502 provides the message to legacy modulator 506. Native modulator 504 modulates the message according to the protocols of the second type network. Legacy modulator 506 modulates the message according to the protocols of the legacy network. It is noted that native modulator 504 and legacy modulator 506 may operate separately or concurrently. Either native modulator 504 or legacy modulator 506 provide the modulated message to analog front end 508. Analog front end 508 transmits the message over the medium (not shown).

Figure 10:
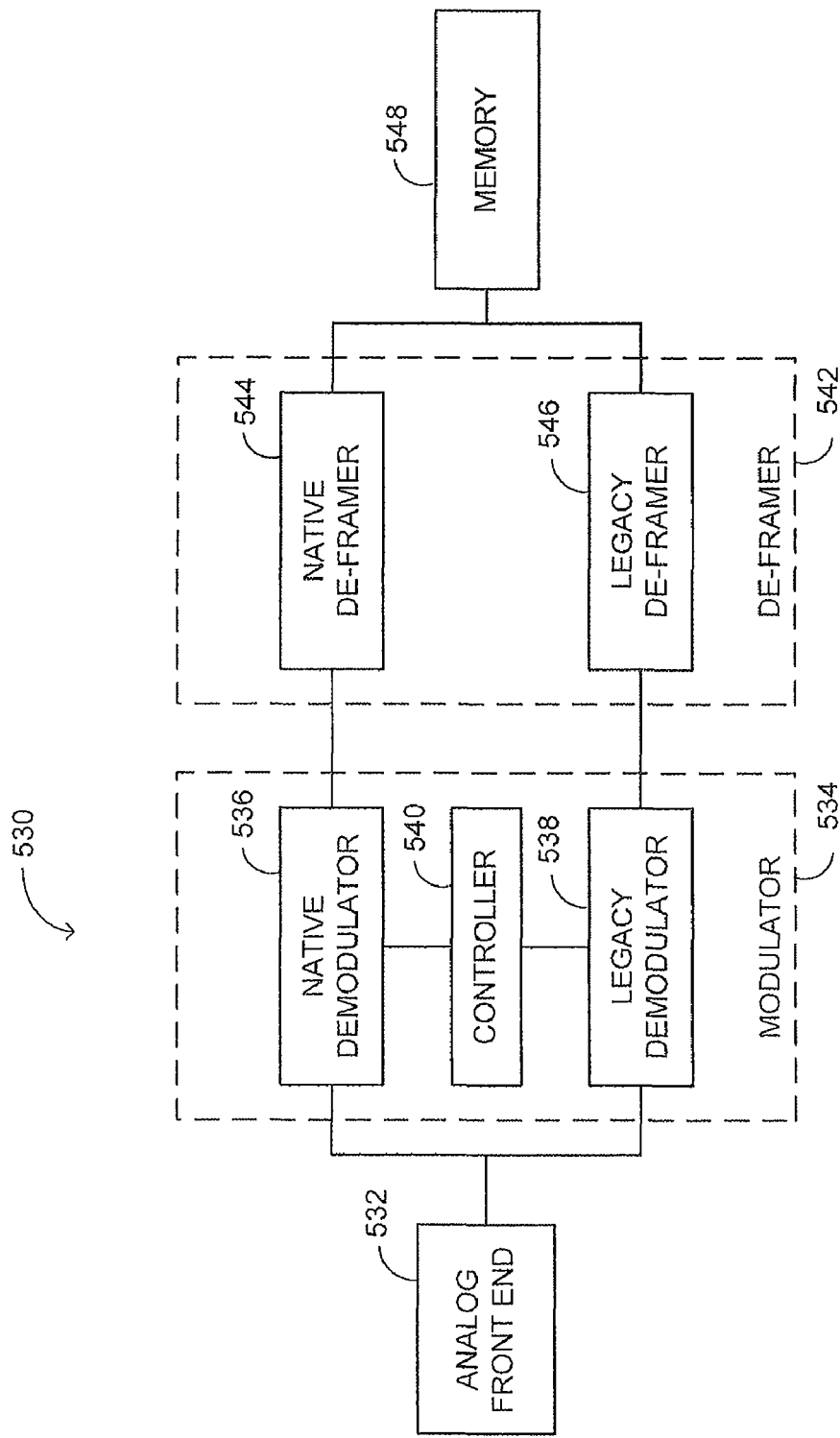
FIG. 10 is a schematic illustration of a native receiver, constructed and operative in accordance with another embodiment of the disclosed technique.

Reference is now made to FIG. 10, which is a schematic illustration of a native receiver, generally referenced 530, constructed and operative in accordance with another embodiment of the disclosed technique. Receiver 530 includes an analog front end 532, a demodulator 534, a de-framer 542 and a memory 548. Demodulator 534 further includes a native demodulator 536, a legacy demodulator 538 and a controller 540. De-framer 542 further includes a native de-framer 544 and a legacy de-framer 546. Controller 540 is coupled with native demodulator 536 and with legacy demodulator 538. Analog front end 532 is also coupled with native demodulator 536 and with legacy demodulator 538. Native de-framer 544 is coupled with native demodulator 536 and with memory 548. Legacy de-framer 546 is coupled with legacy demodulator 538 and with memory 548.

Analog front end 532 receives a message from the medium (not shown). Analog front end 532 provides the received message to native demodulator 536 and to legacy demodulator 538. Each of native demodulator 536 and legacy demodulator 538 determines whether the received message is a native network message or a legacy network message. When the received message is a native network message, native demodulator 536 demodulates the message and provides the demodulated message to native de-framer 544. Native de-framer 544 extracts the information included in the received frames and provides this information to memory 548 for storage. When the received message is a legacy network message, legacy demodulator 536 demodulates the message and provides the demodulated message to legacy de-framer 546. Legacy de-framer 546 extracts the information included in the received frames and provides this information to memory 548 for storage. The information stored in memory 548 may be used by either coordinator first network type device 306 (FIG. 4) or coordinator second network type device 308 (FIG. 4).

It will be appreciated by persons skilled in the art that the disclosed technique is not limited to what has been particularly shown and described hereinabove. Rather the scope of the disclosed technique is defined only by the claims, which follow.

The invention claimed is:

1. A method for coordinating the use of a physical layer between a first network and a second network, said first network including at least one device of a first network type, said at least one device of said first network type operating using a first network protocol, said at least one device of said first network type being coupled with said physical layer, said second network including at least one device of a second network type, said at least one device of said second network type operating using a second network protocol different from said first network protocol, said at least one device of said second network type being coupled with said physical layer, said first network protocol and said second network protocol being non-interoperable, the method comprising the procedures of:
- determining required resources of said first network, for a next transmission cycle;
- determining required resources of said second network, for said next transmission cycle, wherein said first network protocol and said second network protocol support centralized management of nodes by a master device in each of said first network and said second network respectively;
- requesting said required resources of said first network, from said master device of said second network, according to said second network protocol;
- requesting said required resources of said second network, from said master device of said first network, according to said first network protocol;
- allocating resources to said first network, by said master device of said second network, according to said resources requested from said master of said second network; and
- allocating resources to said second network by said master of said first network, according to said resources requested from said master of said first network.

2. The method according to claim 1, further comprising the preliminary procedure of synchronizing the transmission cycles of said first network and said second network.

3. The method according to claim 2, wherein said procedure of synchronizing is performed by negotiating the length of said transmission cycles with said master of said second network to equal the length of said transmission cycles of said first network, according to a neighboring network protocol.

4. The method according to claim 2, wherein said procedure of synchronizing is performed by imposing the length of said transmission cycles of said first network on said second network according to a global master protocol.

5. The method according to claim further comprising after said procedure of allocating resources to said second network, the procedures of:
- receiving from said master of said second network said resources allocated for said first network; and
- receiving from said master of said first network said resources allocated for said second network.

6. The method according to claim 5, further comprising, after said procedure of receiving from said master of said first network, the procedures of:
- monitoring said received resources from said master of said second network and modifying said required resources for said first network accordingly; and
- monitoring said received resources from said master of said first network and modifying said required resources for said second network accordingly.

7. The method according to claim 1, wherein said procedure of requesting from said master of said second network is performed according to a neighboring network protocol.

8. The method according to claim 1, wherein said procedure of requesting from said master of said second network is performed according to a global master protocol.

9. The method according to claim 1, wherein said procedure of requesting from said master of said second network is performed according to a second network device resources allocation request.

10. The method according to claim 1, wherein said procedure of requesting from said master of said second network is performed according to a first network device resources allocation request.

11. The method according to claim 1, wherein said resources are selected from the list consisting of:
- time;
- bandwidth; and
- power.

12. The method according to claim 11, wherein said time represents transmission opportunities within said transmission cycles of said first network and said second network.

13. The method according to claim 1, wherein said procedure of determining required resources of said first network is performed by monitoring the activity on said first network.

14. The method according to claim 13, wherein said monitoring said activity of said first network comprises acquiring carrier sense information.

15. The method according to claim 1, wherein said procedure of determining required resources of said second network is performed by receiving said required resources from said master of said second network.

16. The method according to claim 1, wherein said procedure of determining required resources of said second network is performed by monitoring the activity on said second network.

17. The method according to claim 16, wherein said monitoring said activity of said second network comprises acquiring carrier sense information.

18. The method according to claim 1, further comprising the procedure of transmitting first network type multiple access protocol (MAP) frames when no devices of said first network are coupled with said physical layer.

19. The method according to claim 1, further comprising the procedure of transmitting second network type multiple access protocol (MAP) frames when no devices of said second network are coupled with said physical layer.

20. At least two networks coupled with the same physical layer, devices in each network communicating according to a network protocol respective of each network, said respective network protocols being non-interoperable, said at least two networks comprising:
- at least one device of a first network type, said at least one device of said first network type forming a first network and operating using a first network protocol, said at least one device of said first network type being coupled with said physical layer;
- at least one device of a second network type, said at least one device of a second network type forming a second network and operating using a second network protocol different from said first network protocol, said at least one device of said second network type being coupled with said physical layer, wherein said respective network protocols support centralized management of nodes by a master device in each of said at least two networks respectively; and
- a coordinator, coupled with said physical layer, for coordinating the use of said physical layer between said first network and said second network,
- wherein said coordinator comprising:
  - a receiver, for receiving messages transmitted over said physical layer;
  - a transmitter, for transmitting messages over said physical layer;
  - a coordinator first network type device coupled with said receiver and said transmitter;
  - a coordinator second network type device coupled with said receiver and said transmitter; and
  - a synchronizer and coordinator coupled with said coordinator first network type device and with said coordinator second network type device, said synchronizer and coordinator comprising a required resources determinator, said required resources determinator determining the required resources of said first network for a next transmission cycle by receiving, from said coordinator first network type device, information relating to the use said first network makes of said physical layer, said required resources determinator determining the required resources of said second network for said next transmission cycle by receiving, from said coordinator second network type device, information relating to the use said second network makes of said physical layer, said required resources determinator providing the required resources of said first network to said coordinator second network type device, said required resources determinator providing the required resources of said second network to said coordinator first network type device, said coordinator second network type device transmitting, via said transmitter, a request for said required resources for said first network from a said master device of said second network, according to said first network protocol, said coordinator first network type device transmitting, via said transmitter, a request for said required resources for said second network from said master device of said first network according to said second network protocol, wherein said master device of said second network allocates resources to said first network, according to the resources requested from said master device of said second network, and wherein said master device of said first network allocates resources to said second network, according to the resources requested from said master device of said first network.

21. The at least two networks according to claim 20, wherein said synchronizer and coordinator further comprises a transmission cycles synchronizer, coupled with said required resources determinator, said transmission cycles synchronizer for synchronizing the transmission cycles of said at least two networks.

22. The at least two networks according to claim 21, wherein said transmission cycles synchronizer synchronizes said transmission cycles of said at least two networks by receiving the length and the start of the transmission cycles of said first network from said coordinator first network type device, said transmission cycles synchronizer providing said length and said start to said coordinator second network type device, said coordinator second network type device negotiating the length and the start of the transmission cycles of said second network with said master device of said second network to equal said length of said transmission cycle of said first network, according to a neighboring network protocol.

23. The at least two networks according to claim 21, wherein said transmission cycles synchronizer synchronizes said transmission cycles of said at least two networks by receiving the length and the start of the transmission cycles of said first network from said coordinator first network type device, said transmission cycles synchronizer providing said length and said start to said coordinator second network type device, said coordinator second network type device imposing the length and the start of the transmission cycle of said first network on said second network according to a global master protocol.

24. The at least two networks according to claim 20, said synchronizer and coordinator further comprising an allocated resources monitor, coupled with said required resources determinator, for receiving from said coordinator second network type device, the resources allocated for said first network, wherein said coordinator second network type device receives the allocated resources for said first network from said master device of said second network, and wherein said allocated resources monitor further receives from said coordinator first network type device the resources allocated for said second network, said coordinator first network type device receiving the allocated resources for said second network from said master device of said first network via said receiver.

25. The at least two networks according to claim 24, said required resources determinator modifying the resources required for said first network according to said received allocated resources to said first network, said required resources determinator further modifying the resources required for said second network according to said received allocated resources to said second network.

26. The at least two networks according to claim 20, wherein said coordinator second network type device requests resources from said master device of said second network according to a neighboring network protocol.

27. The at least two networks according to claim 20, wherein said coordinator second network type device requests resources from said master device of said second network according to a global master protocol.

28. The at least two networks according to claim 20, wherein said coordinator second network type device requests resources from said master device of said second network according to a second network device resources allocation request.

29. The at least two networks according to claim 20, wherein said coordinator first network type device requests resources from said master device of said first network according to a first network device resources allocation request.

30. The at least two networks according to claim 20, wherein said resources are selected from the list consisting of:
time;
bandwidth; and
power.

31. The at least two networks according to claim 30, wherein said time represents transmission opportunities within the transmission cycles of said first network and said second network.

32. The at least two networks according to claim 20, wherein said required resources determinator determines said required resources of said first network according to information related to the activity on said first network provided by said coordinator first network type device.

33. The at least two networks according to claim 32, wherein said information related to the activity on said first network is carrier sense information of said first network.

34. The at least two networks according to claim 32, wherein said information related to the activity on said first network is the multiple access protocol (MAP) frame of said first network.

35. The at least two networks according to claim 20, wherein said required resources determinator determines said required resources of said second network by receiving the required resources from said master device of said second network provided by said coordinator second network device.

36. The at least two networks according to claim 20, wherein said required resources determinator determines said required resources of said second network according to information related to the activity on said first network provided by said coordinator second network type device.

37. The at least two networks according to claim 36, wherein said information related to the activity on said second network is carrier sense information of said second network.

38. The at least two networks according to claim 36, wherein said information related to the activity on said second network is the multiple access protocol (MAP) frame of said second network.

39. The at least two networks according to claim 20, wherein when no first network type devices are coupled with said physical layer, said coordinator first network type device assumes the role of a first network type master device and transmits first network type multiple access protocol (MAP) frames.

40. The at least two networks according to claim 39, wherein said coordinator first network type device requests resources from said second network type master for transmitting said first network type MAP frames.

41. The at least two networks according to claim 20, wherein when no second network type devices are coupled with said physical layer, said coordinator second network type device assumes the role of a second network type master device and transmits second network type multiple access protocol (MAP) frames.

42. The at least two networks according to claim 41, wherein said coordinator second network type device requests resources from said first network type master device for transmitting said second network type MAP frames.

43. The at least two networks according to claim 20, wherein said coordinator further comprises at least one other coordinator network device, coupled with said synchronizer and coordinator, for communicating with at least one device of another respective network type.

44. A coordinator for coordinating the use of a physical layer between a first network and a second network, said coordinator being coupled with said physical layer, said first network including at least one device of a first network type, said at least one device of said first network type operating using a first network protocol, said at least one device of said first network type being coupled with said physical layer, said second network including at least one device of a second network type, said at least one device of said second network type operating using a second network protocol different from said first network protocol, said at least one device of said second network type being coupled with said physical layer, said first network protocol and said second network protocol being non-interoperable, said coordinator comprising:

a receiver, for receiving messages transmitted over said physical layer;
a transmitter, for transmitting messages over said physical layer;
a coordinator first network type device coupled with said receiver and with said transmitter;
a coordinator second network type device coupled with said receiver and with said transmitter; and
a synchronizer and coordinator coupled with said coordinator first network type device and with said coordinator second network type device, said synchronizer and coordinator comprising a required resources determinator, said required resources determinator determining the required resources of said first network for the next transmission cycle by receiving, from said coordinator first network type device, information relating to the use said first network makes of said physical layer, said first network protocol and said second network protocol supporting centralized management of nodes by a master device in each of said first network and said network respectively,
said required resources determinator determining the required resources of said second network for the next transmission cycle by receiving, from said coordinator second network type device, information relating to the use said second network makes of said physical layer,
said required resources determinator providing the required resources of said first network to said coordinator second network type device, said required resources determinator providing the required resources of said second network to said coordinator first network type device,
said coordinator second network type device transmitting, via said transmitter, a request for said required resources for said first network from said master device of said second network, according to said first network protocol,
said coordinator first network type device transmitting, via said transmitter, a request for said required resources for said second network from said master device of said first network according to said second network protocol,
wherein said master device of said second network allocates resources to said first network, according to the resources requested from said master device of said second network, and
wherein said master device of said first network allocates resources to said second network, according to the resources requested from said master device of said first network,
thereby coordinating the use of said physical layer between said first network and said second network.

45. The coordinator according to claim 44, wherein said synchronizer and coordinator further comprises a transmission cycles synchronizer, coupled with said required resources determinator, for synchronizing the transmission cycles of said first network and said second network.

46. The coordinator according to claim 45, wherein said transmission cycles synchronizer synchronizes said transmission cycles of said first network and said second network by receiving the length and the start of the transmission cycles of said first network from said coordinator first network type device, providing said length and said start to said coordinator second network type device, said coordinator second network type device negotiating the length and the start of the transmission cycles of said second network with said master device of said second network to equal said length of said transmission cycle of said first network, according to a neighboring network protocol.

47. The coordinator according to claim 45, wherein said transmission cycles synchronizer synchronizes said transmission cycles of said first network and said second network by receiving the length and the start of the transmission cycles of the first network from said coordinator first network type device, providing said length and said start to said coordinator second network type device, said coordinator second network type device imposing said length and said start of said transmission cycles of said first network on said second network according to a global master protocol.

48. The coordinator according to claim 44, wherein said synchronizer and coordinator further comprises an allocated resources monitor coupled with said required resources determinator, said allocated resources monitor receiving from said coordinator second network type device, the resources allocated for said first network, said coordinator second network type device receiving said allocated resources for said first network from said master device of said second network type, said allocated resources monitor further receiving from said coordinator first network type device the resources allocated for said second network, said coordinator first network type device receiving said allocated resources for said second network from said master device of said first network type, via said receiver.

49. The coordinator according to claim 48, said required resources determinator modifying the resources required for said first network according to said received allocated resources to said first network, said required resources determinator further modifying the resources required for said second network according to said received allocated resources to said second network.

50. The coordinator according to claim 44, said coordinator second network type device requesting resources from said master device of said second network according to a neighboring network protocol.

51. The coordinator according to claim 44, said coordinator second network type device requesting resources from said master device of said second network according to a global master protocol.

52. The coordinator according to claim 44, said coordinator second network type device requesting resources from said master device of said second network according to a second network device resources allocation request.

53. The coordinator according to claim 44, said coordinator first network type device requesting resources from said master device of said first network according to a first network device resources allocation request.

54. The coordinator according to claim 44, wherein said resources are selected from the list consisting of:
   time;
   bandwidth; and
   power.

55. The coordinator according to claim 54, wherein said time represents transmission opportunities within the transmission cycles of said first network and said second network.

56. The coordinator according to claim 44, said required resources determinator determining said required resources of said first network according to information related to the activity on said first network provided by said coordinator first network type device.

57. The coordinator according to claim 56, wherein said information related to the activity on said first network is carrier sense information of said first network.

58. The coordinator according to claim 56, wherein said information related to the activity on said first network is the multiple access protocol (MAP) frame of said first network.

59. The coordinator according to claim 44, said required resources determinator determining said required resources of said second network by receiving the required resources from said master device of said second network provided by said coordinator second network device.

60. The coordinator according to claim 44, said required resources determinator determining said required resources of said second network according information related to the activity on said first network provided by said coordinator second network type device.

61. The coordinator according to claim 60, wherein said information related to the activity on said second network is carrier sense information of said second network.

62. The coordinator according to claim 60, wherein said information related to the activity on said second network is the multiple access protocol (MAP) frame of said second network.

63. The coordinator according to claim 44, wherein when no first network type devices are coupled with said physical layer, said coordinator first network type device assumes the role of a first network type master device and transmits first network type multiple access protocol (MAP) frames.

64. The coordinator according to claim 63, wherein said coordinator first network type device requests resources from said second network type master device for transmitting said first network type MAP frames.

65. The coordinator according to claim 44, wherein when no second network type devices are coupled with said physical layer, said coordinator second network type device assumes the role of a second network type master device and transmits second network type multiple access protocol (MAP) frames.

66. The coordinator according to claim 65, wherein said coordinator second network type device requests resources from said first network type master device for transmitting said second network type MAP frames.

67. The coordinator according to claim 44, further comprising at least one other coordinator network device coupled with said synchronizer and coordinator, said other coordinator network device communicating with at least one device of another respective network type.

* * * * *